US008025297B2

(12) United States Patent
Smith

(10) Patent No.: US 8,025,297 B2
(45) Date of Patent: Sep. 27, 2011

(54) BELLOWS WITH ALTERNATING LAYERS OF HIGH AND LOW COMPLIANCE MATERIAL FOR DYNAMIC APPLICATIONS

(75) Inventor: Robert W.M. Smith, State College, PA (US)

(73) Assignee: The Penn State Research Foundation, University Park, PA (US)

(*) Notice: Subject to any disclaimer, the term of this patent is extended or adjusted under 35 U.S.C. 154(b) by 836 days.

(21) Appl. No.: 11/935,787

(22) Filed: Nov. 6, 2007

(65) Prior Publication Data

US 2008/0060442 A1    Mar. 13, 2008

Related U.S. Application Data

(63) Continuation-in-part of application No. 11/116,636, filed on Apr. 28, 2005, now Pat. No. 7,290,771, which is a continuation-in-part of application No. 10/791,497, filed on Mar. 2, 2004, now Pat. No. 7,143,586, which is a continuation of application No. 10/410,492, filed on Apr. 9, 2003, now Pat. No. 6,725,670, said application No. 11/116,636 and a continuation-in-part of application No. 10/942,417, filed on Sep. 16, 2004, now Pat. No. 7,055,332, is a continuation of application No. 10/409,855, filed on Apr. 9, 2003, now Pat. No. 6,792,764.

(60) Provisional application No. 60/371,967, filed on Apr. 10, 2002, provisional application No. 60/445,866, filed on Feb. 6, 2003, provisional application No. 60/565,976, filed on Apr. 28, 2004, provisional application No. 60/372,008, filed on Apr. 10, 2002, provisional application No. 60/894,288, filed on Mar. 12, 2007.

(51) Int. Cl.
*F16J 3/00* (2006.01)
*F16J 15/52* (2006.01)
(52) U.S. Cl. ........................................ 277/635; 277/636
(58) Field of Classification Search .......... 277/634–636, 277/328, 342; 464/173–175
See application file for complete search history.

(56) References Cited

U.S. PATENT DOCUMENTS

| | | | |
|---|---|---|---|
| 2,333,401 A | 11/1943 | Woods | |
| 2,551,505 A | 5/1951 | Olson, Jr. | |
| 2,605,099 A | 7/1952 | Brown | |
| 2,715,444 A * | 8/1955 | Fewel | 166/147 |
| 3,186,722 A | 6/1965 | Johnston | |
| 3,612,549 A | 10/1971 | Berkowitz | |

(Continued)

OTHER PUBLICATIONS

Becht IV, Charles, "The Effect of Bellows Confolution Profile on Stress Distribution and Platic Strain Concentration," PVP-vol. 401, Fitness for Service, Stress Classfication and Expansion Joint Design—ASME 2000.

(Continued)

*Primary Examiner* — Thomas Beach
*Assistant Examiner* — Gilbert Lee
(74) *Attorney, Agent, or Firm* — Gifford, Krass, Spinkle, Anderson & Citkowski, P.C.; Douglas L. Wathen

(57) ABSTRACT

A bellows has a generally tubular elongated bellows body. The bellows body is defined by a wall generally enclosing a volume. The wall has a generally cylindrical inner surface and a generally cylindrical outer surface. The bellows body is formed by alternating layers of low compliance material and high compliance material. The cross sectional shape and dimension of the bellows body are generally constant between the first and second ends.

18 Claims, 23 Drawing Sheets

U.S. PATENT DOCUMENTS

| | | | |
|---|---|---|---|
| 3,866,440 A | 2/1975 | Stananought et al. | |
| 3,990,490 A | 11/1976 | Voelz | |
| 4,043,546 A | 8/1977 | Ashfield et al. | |
| 4,086,825 A | 5/1978 | Badcock et al. | |
| 4,289,317 A * | 9/1981 | Kuc | 277/308 |
| 4,345,772 A | 8/1982 | Woody et al. | |
| 4,438,957 A * | 3/1984 | Williams et al. | 285/223 |
| 4,513,946 A | 4/1985 | Priese | |
| 4,673,188 A | 6/1987 | Matsuno et al. | |
| 4,911,482 A | 3/1990 | Doat et al. | |
| 4,923,432 A | 5/1990 | Porter | |
| 4,957,469 A * | 9/1990 | Zollinger | 464/175 |
| RE33,696 E | 9/1991 | Stevenson et al. | |
| 5,050,894 A | 9/1991 | Merel et al. | |
| 5,118,086 A | 6/1992 | Stevenson et al. | |
| 5,308,230 A | 5/1994 | Moore | |
| 5,439,035 A | 8/1995 | Dal Palu e et al. | |
| 5,647,216 A * | 7/1997 | Garrett | 62/6 |
| 5,772,413 A | 6/1998 | Oshidari et al. | |
| 5,813,234 A | 9/1998 | Wighard | |
| 5,915,930 A | 6/1999 | McNaull | |
| 6,237,922 B1 | 5/2001 | Armstrong | |
| 6,318,729 B1 * | 11/2001 | Pitts et al. | 277/511 |
| 6,382,079 B1 | 5/2002 | Webb | |
| 6,725,670 B2 | 4/2004 | Smith et al. | |
| 6,739,976 B2 | 5/2004 | Glowacki et al. | |
| 6,755,027 B2 | 6/2004 | Garrett | |
| 6,792,764 B2 | 9/2004 | Poese et al. | |
| 6,932,346 B1 | 8/2005 | Hayward et al. | |
| 7,011,312 B2 * | 3/2006 | Ishida | 277/342 |
| 2002/0132676 A1 | 9/2002 | Glowacki et al. | |
| 2004/0262854 A1 | 12/2004 | Matczak et al. | |
| 2006/0066062 A1 | 3/2006 | Sugiyama | |

OTHER PUBLICATIONS

Smith, Robert W.M., "High Efficiency Two Kilowatt Acoustic Source for a Thermoacoustic Refrigerator," The Penn State University Applied Research Laboratory (Technical Report), Dec. 2000.

\* cited by examiner

Surface Stress Due to Displacement (QW=0.5, QDT=1.0)

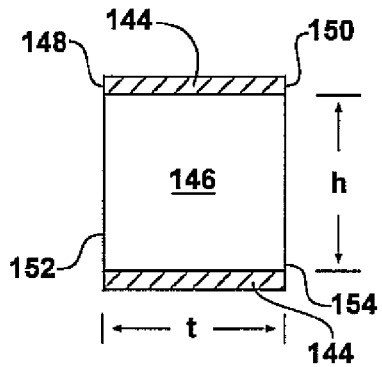 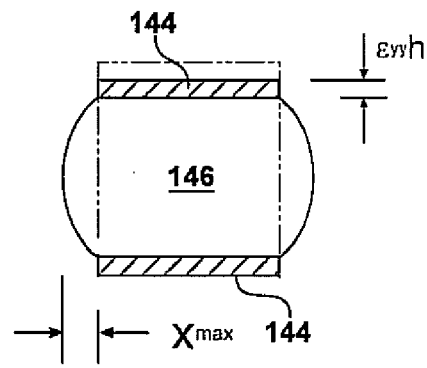
FIG - 33A     FIG - 33B
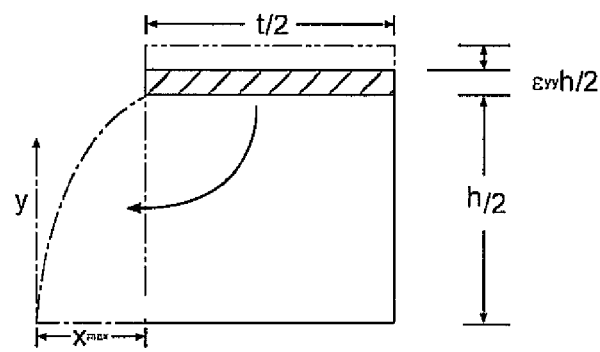
FIG - 34
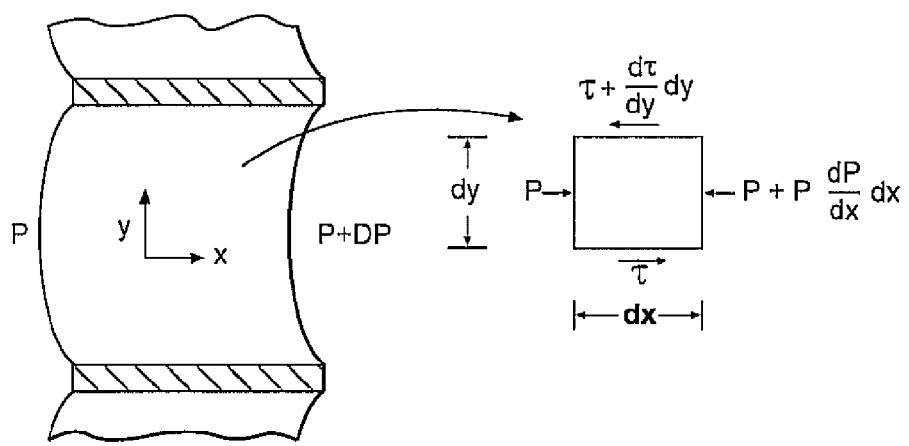
FIG - 35

Crack groth rate vs. tearing energy of natural rubber, in a laboratory atmosphere

BELLOWS WITH ALTERNATING LAYERS OF HIGH AND LOW COMPLIANCE MATERIAL FOR DYNAMIC APPLICATIONS

REFERENCE TO RELATED APPLICATIONS

This application claims priority from U.S. Provisional Patent Application Ser. No. 60/894,288, filed Mar. 12, 2007.

This application is also a continuation-in-part of U.S. patent application Ser. No. 11/116,636, filed Apr. 28, 2005, which claims priority to U.S. provisional patent application Ser. No. 60/565,976, filed Apr. 28, 2004.

This application is also a continuation-in-part of U.S. patent application Ser. No. 10/942,417, Sep. 16, 2004, now U.S. Pat. No. 7,055,332, issued Jun. 6, 2006, which is a continuation of U.S. patent application Ser. No. 10/409,855, filed Apr. 9, 2003, now U.S. Pat. No. 6,792,764, which claims priority from U.S. Provisional Patent Application Ser. Nos. 60/372,008, filed Apr. 10, 2002; 60/371,967, filed Apr. 10, 2002; and 60/445,866, filed Feb. 6, 2003.

This application is also a continuation-in-part of U.S. patent application Ser. No. 10/791,497, Mar. 2, 2004, now U.S. Pat. No. 7,143,586, issued Dec. 5, 2006, which is a continuation of U.S. patent application Ser. No. 10/410,492, filed Apr. 9, 2003, now U.S. Pat. No. 6,725,670, which claims priority from U.S. Provisional Patent Application Ser. Nos. 60/372,008, filed Apr. 10, 2002; 60/371,967, filed Apr. 10, 2002; and 60/445,866, filed Feb. 6, 2003.

The entire content of each application and patent are incorporated herein by reference.

FIELD OF THE INVENTION

The present invention relates to bellows seals for dynamic devices and applications and, more particularly to a bellows formed by alternating layers of low compliance and high compliance materials.

BACKGROUND OF THE INVENTION

In electrically driven thermoacoustic refrigerators, and in other applications, a need exists to couple reciprocating mechanical work, produced by an electromechanical transducer to the working gas. In engines, one can conceive of the reverse process. An example of usage within thermoacoustic machines has been described in U.S. Pat. No. 6,725,670. Several examples exist of this type of structure. Conventional corrugated metal bellows have often been used. In general, these metal bellows structures begin as a sheet product, are welded into a tubular shape, and the corrugations are subsequently formed. These forming and assembly operations place some restrictions on the types of material that can be used, and production of corrugated metal bellows with high endurance limit materials can become expensive. Materials like Inconel 718 and 17-7Ph stainless steel have been used for the construction of bellows, which have high endurance limits in their final condition, and yet are ductile and weldable; not inexpensive as raw materials, these materials further rely for their high strength on lengthy (and thus costly) precipitation hardening heat treatments. This has encouraged the development of alternatives for thermoacoustic applications and U.S. Pat. No. 6,755,027 describes a recent novel alternative structure to accomplish this task. The subject of the current invention is application of a new bellows structure to perform this function.

For purposes of this disclosure, a bellows is defined as any tube-like conveyances or compliant cavities with substantial compliance along the axis of motion, which provide a boundary over which a pressure difference can be maintained and which are intended in operation to undergo axial compression, as a desired part of their function. As such, this definition includes devices such as described in U.S. Pat. Nos. 6,237,922, 6,725,670, and 6,755,027, the entire contents of all of which are incorporated herein by reference. This definition also includes other devices not specifically named as bellows, as would be recognized by a person of skill in the art. "Conventional bellows" will be used to refer to bellows with essentially uniform stiffness properties along the axis of the bellows structure, as is well approximated by a number of identical repeated structural elements along the compression axis of the bellows. When referring to "formed bellows", aspects relevant to the sort of corrugated structures described by the Standards of the Expansion Joint Manufacturers are described. Bellows may be formed from a variety of materials, including metal and elastomeric material, and may be formed in a variety of ways.

The field of use of bellows seals on reciprocating pistons is quite old and well developed. In reciprocating machine applications, wherein part of the expected operation of the bellows is that it undergo axial compression and yet act as a piston seal at relatively high frequencies, problems associated with the relatively slow wave speed in bellows materials are a recognized issue, and various methods have been devised to compensate. (For a discussion of the problems, and methods to compensate see, for example, U.S. Pat. Nos. 3,875,806 to Brewster and 4,556,369 to Braun, wherein external devices are employed to stabilize the bellows and multiple attachments are made to the bellows, intermediate between the ends.)

The recognized problem can be summarized in this manner: bellows are designed to be compliant structures, and yet they have non-trivial mass, so that the propagation rate of a disturbance initiated at one end, traveling through the bellows is much slower than in the bulk media of which the bellows are constructed. As such, standing waves form and this causes stress distributions that are locally higher and different in distribution from what is observed in the static compression or extension case. In general, for applications in reciprocating machinery, it is desirable to ensure that the stresses in the bellows are minimized so that the part will have the greatest fatigue resistance, and thus a large lifetime.

SUMMARY OF THE INVENTION

One approach to addressing the issues discussed above is to provide a bellows with tailored stiffness or mass density that varies between the ends. Such a design is discussed hereinbelow. In some applications a generally uniform stiffness bellows, composed of alternating layers of high and low compliance material, can be adequate and/or more cost effective than one in which the stiffness is tailored. The present invention describes such bellows, suitable for dynamic applications in which the bellows structure must support periodic oscillatory pressure differences and axial contraction and expansion along the bellows axis.

Such a bellows has a generally tubular elongated bellows body. The bellows body is defined by a wall generally enclosing a volume. The wall has a generally cylindrical inner surface and a generally cylindrical outer surface. The bellows body is formed by alternating layers of low compliance material and high compliance material. The cross sectional shape and dimension of the bellows body are generally constant between the first and second ends.

In some preferred versions, the thickness, t, and the height, h, for each of the layers of high compliance material are chosen such that the total strain energy, $U_{strain\_total}$, in each of the high compliance layers, as given approximately by the formula:

$$U_{strain\_total} = \frac{1}{2} G \varepsilon^2 \left( 4(t \cdot h) + \frac{t^3}{h} \right) + \left( \frac{\Delta P^2}{2G} \right) \frac{h^3}{12t}.$$

is within 20% of the minimum obtainable total strain energy for any values of t and h.

In other preferred versions, the thickness, t, and the height, h, for each of the layers of high compliance material are chosen such that the maximum shear strain, $\gamma_{xy\_max}$, in each of the high compliance layers, as given approximately by the formula:

$$\gamma_{xy\_max} = \left( \frac{\Delta P}{G} \right) \frac{h}{2t} + 3 \frac{\varepsilon t}{h}$$

is within 20% of the minimum obtainable maximum shear strain for any values of t and h.

The present invention also provides a thermoacoustic device having a housing and a thermal core disposed in the housing. A piston is spaced from the thermal core and is operable to oscillate with respect to the thermal core. A generally tubular elongated bellows body has a first end sealed to the piston and a second end in fluid communication with the thermal core. The bellows body has a cross sectional shape and a cross sectional dimension that are generally constant between the ends. The bellows body is defined by a wall generally enclosing a volume. The bellows body is formed of alternating layers of low compliance material and high compliance material.

BRIEF DESCRIPTION OF THE DRAWINGS

FIG. 33A is a detailed view showing the portion of two low compliance layers sandwiching a portion of the high compliance layer;

FIG. 33B is a view similar to FIG. 33A illustrating compression of the high compliance layer;

FIG. 34 is a view of a portion of a low compliance layer and a high compliance layer showing distortion during compression of the high compliance layer;

FIG. 35 is another view of portions of two low compliance layers sandwiching a portion of a high compliance layer illustrating distortion of the high compliance layer;

DETAILED DESCRIPTION OF THE PREFERRED EMBODIMENTS

Figure 1:
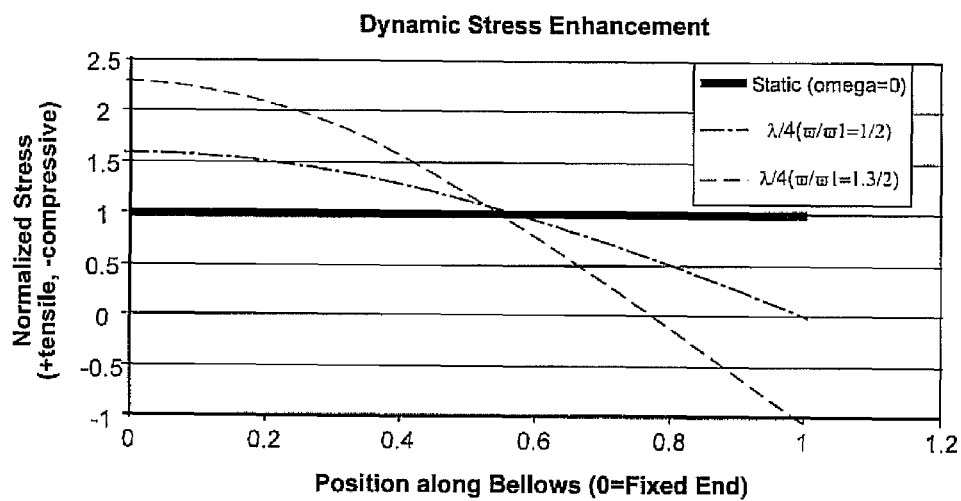
FIG. 1 is a graph showing dynamic stress enhancements for various bellows geometries.

The present invention is directed to an improvement on bellows seals such as employed in thermoacoustic devices, including those shown in U.S. Pat. Nos. 6,792,764 and 6,725,670, the entire contents of both of which are incorporated herein by reference. These machines, by their nature, most often operate over a modest frequency range. Improvements can be achieved by means of producing a bellows with an axial stiffness and/or axial linear mass density (mass per unit length) which varies monotonically from the fixed end, where it is highest, to the moving end, where it is lowest. The resulting bellows can operate with lower stresses, or accept higher piston motion, than a comparative bellows of constant stiffness and or density. This improvement brings either higher fatigue resistance, or permits designs with higher power capacity and pressure ratios in thermoacoustic devices, which typically operate over a fairly narrow frequency range. Similar advantages may be conveyed upon other reciprocating machinery designed to couple mechanical reciprocating motion or work into fluids or gases, for example in pumps. A few examples of pumps which use bellows can be seen in U.S. Pat. Nos. 5,772,413; 5,308,230; and 5,915,930. When pumps are designed to operate over a modest frequency range, they may enjoy a benefit from the present invention. A further benefit provided by the present invention over prior art bellows, in these dynamic applications, is that the axial resonance frequencies of the structures are inherently non-integer multiples of each other. In practice, this means that when the structure is driven with a periodic forcing function (and therefore contains higher order harmonics in the forcing function), the higher order modes in the structure are not strongly excited, since their resonance frequencies do not fall on harmonics of the driving frequency. When such overlap occurs, it can lead to failure in the bellows seal due to excessive deflection at resonance in these higher order and weakly damped modes.

As used herein, "monotonically" varying or decreasing between the ends means that the value referred to has a particular magnitude at one end, a lower magnitude at the other end, and the continuous mathematical function which approximates the magnitude of the value between the ends decreases or remains constant as one advances from one end to the other. The magnitude of the value is non-increasing.

Use of such a continuous monotonic function to describe the equivalent value (stiffness or density) instead of the actual point by point stiffness (even as it may vary within a repeated structural element or due to manufacturing considerations) is in keeping with the fact that the dynamic behavior of the bellows can be modeled by such a function (describing the values) whenever the frequency is such that the wavelength associated with the excitation is large compared to highly localized variations in the structure. So long as the wavelength associated with the excitation frequency in a structure which consists of repeating structural elements is long compared to that of a single structural element, for purposes of modeling the dynamic behavior, the value of the function will be that associated with an equivalent value with an average value of density and stiffness within each element.

As such, it will be recognized that the local value of the function will include the dynamic effect associated with what may be a very wide range of stiffness, particularly within structural elements and at transitions, and yet this should not be viewed as comprising a non-monotonic variation in the function, so long as these variations are small compared to a wavelength. For example, in a structure which consists of alternating layers of very compliant material with very stiff material, the function which describes the effective stiffness and density of each repeating structural element can be a monotonic function, for purposes of modeling the dynamic behavior, while the point to point magnitude of the value may vary radically above and below that described by the monotonic function within a structural element or at a transition; the function which models the dynamic behavior shall be construed by this approach to be considered still monotonic.

Conventional bellows are designed to move in quasi-static or low frequency operation (such as for pressure sensors) but must also accommodate mechanical excitation by nuisance broadband vibration or particular frequencies, which are not part of the desired function of the bellows, but a substantial practical consideration. The range of applications and means to deal with vibrations can be seen for example in U.S. Pat. Nos. 2,333,401 and 6,382,079. In general, these applications tend to be designed to minimize the response of the bellows to high frequency external excitation, while permitting the bellows to continue to operate in its intended quasi-static operation.

For many applications, the effect of the pressure differential the bellows must maintain on the calculated fatigue life can be small when compared with the effects of deflection stresses. Some embodiments of the present invention reduce the effects of deflection stress. Depending to a great extent on the magnitude of the pressure differential across the bellows for a given application, and the resulting magnitude and temporal phasing of the stresses in the bellows material associated with such pressures, and the particular geometry of the bellows, the combined impact of deflection and pressure for a particular end use must be contemplated, and this is ordinarily done by those skilled in the art. Since such pressure stresses must be included in the analysis, and they vary from application to application, a single optimal solution to reducing the deflection stresses does not exist.

It has been recognized in published prior art that, for a given operating frequency and bellows geometry, an optimum bellows length exists. This section provides background on this material. For a thermoacoustic device such as shown in U.S. Pat. Nos. 6,792,764 and 6,725,670, one must accommodate the piston stroke, whose magnitude will be hereafter referred to as $2\Delta_{max}$, and one must design around an operating frequency of the device (and piston), denoted by f, in cycles per second. To develop the proper equations, one can begin with the overall spring constant of the bellows, and the mass, which as a practical matter are readily obtained for a given bellows. Since a conventional bellows consists of a number of repeated structural elements of equal mass and stiffness, we can approximate the bellows as a continuous system with an equivalent stiffness and mass per unit length. If k is the spring constant of a bellows of a given length, one may write Hooke's law, to obtain the Force F in a differential length element dy as $$F = k \frac{L}{dy} \cdot \frac{d\xi}{dy} dy. \qquad (A.1)$$

$\xi$ represents the displacement of a differential bellows segment along the axis y of the bellows. L properly refers to the length of the segment of the bellows with convolutions for a formed bellows. Often an integral collar or other structural element with negligible relative compliance is attached to the bellows, which is not to be included in the proper bellows length L.

If the force in the spring is a function of position (i.e. a non-static condition), one can use the first term in a Taylor series expansion to find the net force on an element dy, $$F_{y1} - F_{y2} = \frac{dF}{dy} dy \qquad (A.2)$$

If we let $\mu$ be the bellows mass per unit length along the bellows axis, one can write Newton's second law for the element, after substituting for F from (A.1) into (A.2) to obtain the equation of motion for a general bellows segment:

$$\frac{d}{dy}\left(kL\frac{d\xi}{dy}\right) = \mu dy \frac{d^2\xi}{dt^2} \qquad (A.3)$$

Assuming operation at nominally a single frequency the solution to this equation is of the form:

$$\xi = [A \sin(\kappa y) + B \cos(\kappa y)](\cos \omega t) \qquad (A.4)$$

where A and B can be evaluated from the bellows boundary conditions, $\kappa$ is the wavenumber and t is time. Frequency f and effective compressional wave speed c are related to the $\kappa$ in the usual manner as:

$$\kappa = \frac{\omega}{c} = \frac{2\pi f}{\lambda f}. \qquad (A.5)$$

$$c = \sqrt{\frac{kL}{\mu}} = L\sqrt{\frac{k}{m_{bellows}}}$$

Now considering the application of a piston seal, we assume the bellows is fixed at one end, (y=0), and has a prescribed (time harmonic) displacement with a peak value $\Delta_{max}$, at the other end (y=L). It can be seen that for this set of conditions, the parameter B in equation (A.4) is zero; defining the end deflection to be $\Delta_{max}$ at the location y=L (the moving end of the bellows), one can obtain equation (A.6) by equating A in equation (A.4) to $\Delta_{max}$:

$$\xi = \frac{\Delta_{max}}{\sin\left(\frac{2\pi f}{2Lf_1}L\right)} \sin\left(\frac{2\pi f}{2Lf_1}y\right) \qquad (A.6)$$

where we have defined $f_1$, which would correspond to the first axial resonance in the bellows, and is given by:

$$f_1 = \frac{1}{2}\sqrt{\frac{k}{m_{bellows}}}. \qquad (A.7)$$

The strain is the derivative of the displacement, so that:

$$\frac{d\xi}{dy} = \frac{\Delta_{max}}{\sin\left(\frac{\pi f}{f_1}\right)} \left(\frac{\pi f}{Lf_1}\right) \cos\left(\frac{\pi f}{Lf_1}y\right). \qquad (A.8)$$

Maximum strain always occurs at y=0, where the bellows is fixed. Of course, stress is proportional to strain in this analysis; such a condition is also an implicit requirement for high cycle-fatigue resistance. One may take the ratio of the maximum strain, to the (uniform) strain that occurs in the static case (i.e., $\Delta_{max}/L$, which is static), to compute a dynamic strain (and therefore also stress) magnification factor:

$$\Phi_m \equiv \frac{\text{bellows maximum dynamic strain}}{\text{bellows static strain}} = \frac{\left(\frac{\pi f}{f_1}\right)}{\sin\left(\frac{\pi f}{f_1}\right)} \qquad (A.9)$$

For a compressional wave speed, c, in the bellows, one may differentiate equation (A.8) with respect to L:

$$\frac{d}{dL}\frac{d\xi}{dy} = -\Delta_{max}\kappa^2 \frac{\cos(\kappa L)}{\sin^3(\kappa L)}. \qquad (A.10)$$

Setting equation (A.10) to be equal to zero defines the optimum length L of the bellows in terms of stress, for a given end displacement, and bellows geometry. Thus, when L=λ/4, a minimum is reached in the strain, for a given compressional wave speed and end displacement; increasing or decreasing L from this length results in higher stresses. It is important to observe that in contrast to the static case, where the strain in the bellows can always be made smaller by increasing the length of the bellows, this is not true in the dynamic case. It should be noted that, in general, the optimum length for the uniform property conventional bellows did not in anyway depend on the particular configuration of the bellows; this is a completely general result, independent of the geometrical form or materials of construction of the bellows. FIG. 1 provides an illustration of bellows dynamic stress enhancement for a given bellows geometry length operated at several frequencies. The position along the length of the bellows has been normalized such that the end of the bellows is at unity (i.e. 1).

It can also be observed, in the analysis above, that the optimum value of the bellows length chosen to minimize the strain for a given end deflection leads to a bellows length which is ¼ of the wavelength of a compressional wave at the chosen operating frequency. For a bellows of this type, if instead of a perfectly sinusoidal drive, an arbitrary function with the same periodicity is chosen, it is well known that the driving function can be represented by an infinite Fourier series which has frequency components that correspond to integer fractions of the period. As such, the driving function will then contain harmonics, associated with non-linearities in the driving mechanism, with aspects of the drive control, or other aspects of the implementation. Practical examples that generate such harmonics could include such conditions as forcing the end of the bellows to move with an electrodynamic driver which, when driven with a perfectly sinusoidal voltage, has some non-linearity, or perhaps driving a linear transduction device with an only approximately sinusoidal voltage, as might be done with a pulse-width-modulation scheme, when driven by a switching amplifier. In the case when such harmonics are also contained within the forcing function, for an optimal bellows as described above, the harmonics of the drive will lie near resonances of the bellows structure itself (for example, a frequency component in the end displacement at twice the frequency will be able to excite the ½ wavelength mode of the bellows). When this is true, and these modes may be only weakly damped, as is often desired to reduce power consumption in the bellows itself, these harmonics in the driving function can lead to large deflections in the bellows, in addition to those associated with the fundamental frequency, described above. Improved bellows, according to some embodiments of the present invention, inherently do not have resonance frequencies which are integer multiples of their fundamental mode, and thus eliminate the above discussed potential failure mode.

One may observe, in FIG. 1, that the solution that minimizes the bellows stress results in a fairly non-uniform stress profile along the axis of the bellows. In the optimum solution, the bellows stress approaches zero near the moving end (the optimum case is indicated by the plot with the legend marking $\omega/\omega_1=1/2$). This indicates that one can obtain greater deflection at the end and/or lower stresses at the fixed point by producing a bellows that has a monotonically decreasing stiffness and/or linear mass density as one moves from the fixed end to the moving end. To implement this mathematically, one can return to equation (A.3), and consider solutions to that equation in which k and µ are functions of the location along the axis (y) of the bellows.

In general, it can be difficult to find closed form solutions to (A.3) when arbitrary variable coefficients are present; it is however possible to obtain numerical results for reasonably smooth variations, in these parameters. In as much as the particular construction of the bellows and implementation of this combination of variable properties along the bellows axis influences the stresses, and thus the particular desired mathematical form, it is not possible to show a single mathematical relationship which will optimize the stress to cover all possible cases of generalized bellows. As such, an optimum solution cannot be defined. Further, as noted above, interactions can exist in between the pressure stresses and the deflections stresses, and the exact magnitude of the former influences the desired mathematical form as well, such that optimization for deflection may not produce the optimum part for function. Nonetheless, it is clear from the description herein how improvements can be made for frequency optimized bellows, beyond the prior art, and the designer of a particular bellows configuration can appropriately superimpose additional stresses associated with pressure which are particular to the design of the bellows.

It should be noted that a bellows having a monotonically changing cross-sectional internal area, which varies from one end to the other, can also accomplish the goal of varying stiffness and mass. A bellows with a tapered internal cross-sectional area, from one end to the other can accomplish the goal of reducing stresses in a reciprocating application, if suitably designed, and examples of tapered bellows (for example camera bellows) exist in prior art. This variation in cross-sectional area can be a disadvantage in many applications, such as a thermoacoustic device, because a given motion at the small end of the bellows will produce lower volumetric velocity, for a given end displacement, in comparison with a bellows of generally uniform cross-sectional area, from one end to the other. Similar considerations occur in other applications, such as pumps. As such, the approach described herein focuses on means to accomplish optimization of bellows for single frequency operation in which the cross-sectional area preferably remains generally constant.

Design Approach for Bellows According to Some Embodiments of the Present Invention One aspect of the present invention is the provision of a design approach for bellows. Frequency optimized bellows, having uniform density and stiffness along the axis, and a length optimized for operating frequency serves both as a reference, for illustrations of the level of improvement to be obtained in examples given later, as well as a starting point for the design for any improved part. Beginning with such a design, the steps to be taken may be summarized as follows:

1) Functional relationships for stress, bellows axial stiffness and mass density relations (for static displacements) as a function of displacement and the bellows geometry/construction are extracted. These are unique to the particular bellows type chosen as well as the means used to achieve the desired property variation. In any generalized bellows, these functional relationships can be expressed, and are part of the established art.

2) Beginning with the relations established above, a stiffness and/or mass per unit length (linear mass density) profile is produced which can be expressed mathematically, as a function of distance along the bellows. The stiffness and/or density are arranged to be decreasing in magnitude from the fixed end of the bellows. Care should of course be taken that the stiffness and/or density not achieve physically impossible values over the length of the part (i.e. zero or negative values.).

3) Using the trial mathematical profile produced in step 2, equation (A.3) is solved numerically, to provide the displacement in the bellows as a function of length along the bellows. Boundary conditions are established such that at the fixed end the displacement is zero, and the moving end produces the required piston motion (i.e. the reciprocating machine output.) Many techniques exist to numerically evaluate this differential equation, and are know to practitioners in the art. In fact, many modern hand calculators have this capability.

4) The displacement as a function of distance along the bellows, obtained in step 3, is numerically differentiated, to produce the strain as a function of position in the bellows.

5) The appropriate relationship between strain and stress (established in step 1) is used to calculate the dynamic stress profile in the part.

6) The stress profile thus obtained is then examined for the maximum value of stress, and the stress profile. The practitioner may at this point evaluate the relative benefit, for a given profile, of the relative benefit/cost to achieve further reductions in stress, by various physically and practically realizable means of implementing the desired property variation, described by the trial mathematical formulation. If at any point the local stresses become higher than the equivalent prior art case, the indication is that the local stiffness in the bellows is substantially too low and/or remains too low over too long a length along the axis of the bellows. Phenomenologically, one can see that this can occur when the compressional wavespeed in the property tailored section becomes too slow, and strong wave effects are seen in the bellows, essentially of the type that resulted in the optimum length selection in the prior art.

For purposes of illustration, we consider here several illustrative examples, with the first two cases based upon formed bellows geometry, of the sort shown in the primary exemplary embodiment of the thermoacoustic device of U.S. Pat. No. 6,792,764. The third will describe a 'hoop-stack' type of approach, which will be described after the formed bellows type solutions.

Conventional formed bellows are described in detail in the Standards of the Expansion Joint Manufacturers Association. Even with such a bellows, a number of methods exist to vary the density and/or stiffness in the desirable way along the axis. As illustrative examples using bellows of this type, we consider cases of varying thickness in the material of which the bellows is made, since this method offers the greatest improvement in terms of stress reduction. As a practical matter, it is also possible to vary the convolution height, and by such means decrease the stiffness per unit length; doing so however also increases the mass per unit length, and the latter offsets some of the theoretical gain. Other approaches to varying axial stiffness and/or density may also be used.

Illustrative Example: Formed Bellows with Tailored Material Thickness

Figure 2:
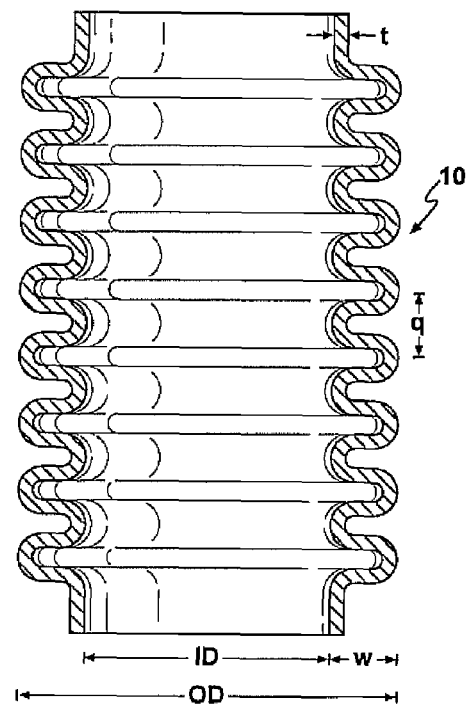
FIG. 2 is a cross-sectional view of a bellows with a corrugated wall.

Following the procedure outlined above, in order to illustrate the improvement on a formed bellows, the relationship in the stresses and stiffness of formed bellows geometries must be provided. A typical conventional formed bellows 10 is shown in FIG. 2, and can be fully characterized by 4 dimensions: the inside diameter (ID), the convolution height or span (w), the convolution pitch (q), and the material thickness (t). It should be noted that the material thickness (t) is illustrated thicker than typical, due to the difficulty in illustrating a thin wall.

Figure 3:
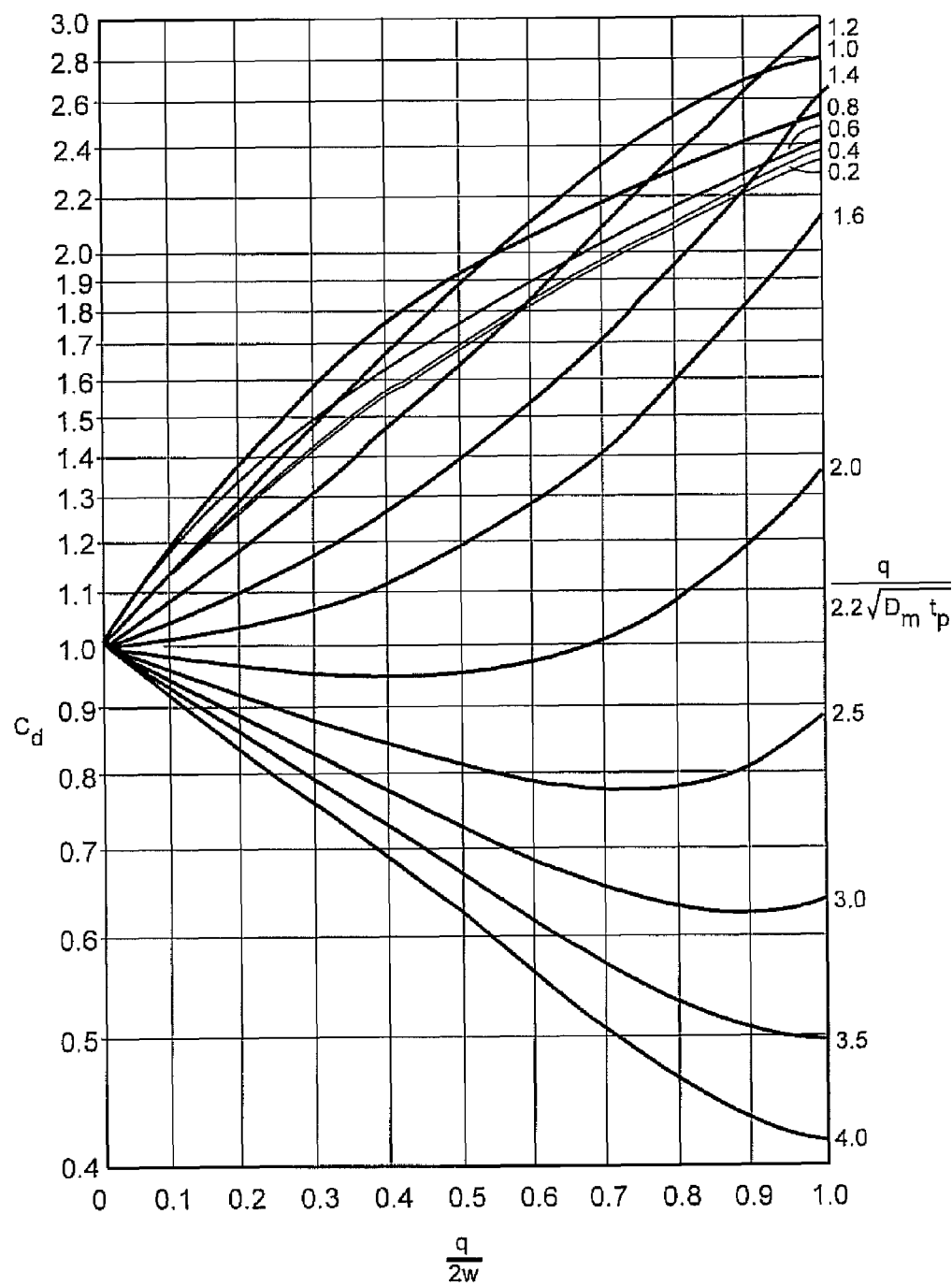
FIG. 3 is a graph showing values for a numerical factor useful in designing bellows.

The dominant deflection stresses in formed bellows are meridional bending stresses. This dominant stress in a particular convolution geometry can be obtained from:

$$\sigma = \epsilon q (5 E_b t / 3 w^2 C_D) \quad (A.11)$$

where $E_b$ is the modulus of the material. $C_D$ is a numerical factor based on two mathematically dimensionless groups of the four geometric variables that describe the bellows geometry. Stress is denoted by $\sigma$, and $\epsilon$ is the strain. For modest changes in the thickness of the bellows, the rate of change in $C_D$ can be fairly low, especially in geometries chosen to minimize deflection stress, wherein $C_D$ is near unity. So, for the analysis that follows, this contribution will be neglected, towards keeping the example cases understandable, although it could readily be included. FIG. 3, adapted from the EJMA standards, shows the relationship for $C_D$ as a function of the bellows geometry.

The stiffness of a single convolution can be characterized by $$k_{convolution} = 1.7 (D_m E_b t^3 / w^3 C_F) \quad (A.12)$$

Figure 4:
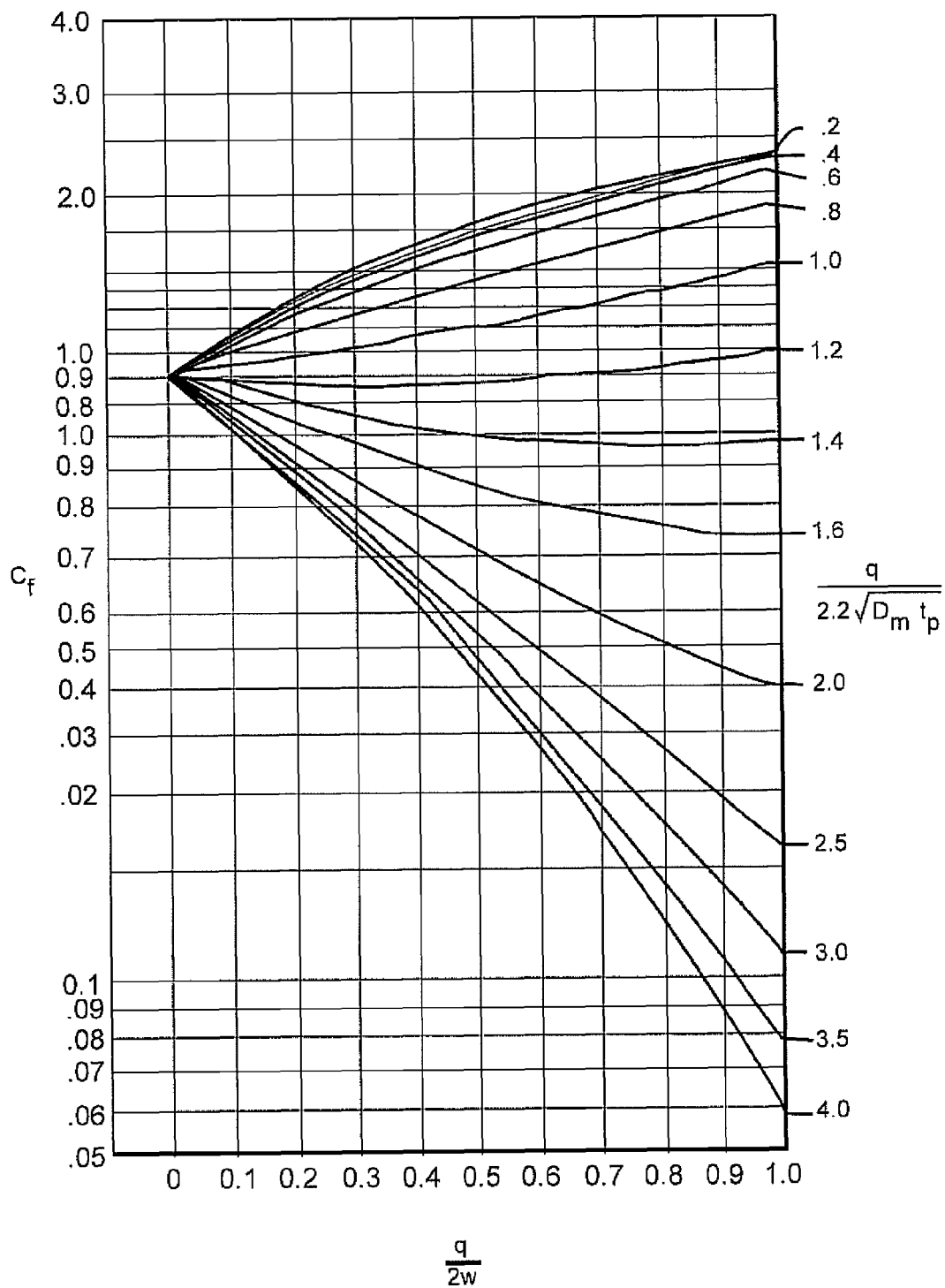
FIG. 4 is a graph showing values for another numerical factor useful in designing bellows.

FIG. 4, which is adapted from the EJMA Standards, shows values for $C_F$ as a function of the formed bellows geometry. As shown, $C_F$ is again a numerical factor, which tends to vary slowly, and $D_m$ is the sum of the bellows inside diameter, ID, and the convolution height—essentially a mean diameter. Again the impact of this numerical factor ($C_F$) will be neglected, for purposes of illustrating the method used to improve this geometry, although it could be included. One can calculate the mass of the bellows based upon the geometry and known material properties. We may note in particular, for purposes of tailoring and modeling the properties of the bellows, that since this example uses a formed bellows and the convolution pitch and height have been held constant, the mass of the convolution is simply proportional to its thickness.

Table 1, below, provides sample calculations for a formed bellows having a 6 inch inside diameter, a 7 3/16 inch outside diameter, 8 convolutions, and a constant wall thickness of 0.016 inches. For this example, the material used for the calculations was either Inconel® alloy 625 or 718, which are nickel based alloys. Other values and assumptions will be apparent from the Table. This baseline bellows has a geometry similar to the bellows 10 in FIG. 1, though with different dimensions and number of convolutions.

TABLE 1

Baseline Stress Computations

Normalized Data for 6 inch ID, 7 3/16 OD 8 convolution 0.016 inch thick bellows

| | | |
|---|---|---|
| $k := 566 \cdot \dfrac{4.45}{.0254}$ | | Bellows Equivalent Overall Stiffness |
| l: = 5.6 · 0.0254 | l = 0.1422 | Bellows Overall Length (meters) |
| $m := \dfrac{1.33}{2.204}$ | | Overall Bellows Mass (kg) |
| $\omega := 2 \cdot \pi \cdot 100$ | | Operating Frequency (rad/sec) |
| $p_\omega := \left(\dfrac{m}{l}\right) \cdot \omega^2$ | | Mass per unit length* omega^2 |
| $E_0 := k \cdot l$ | $E_0 = 1.4105 \times 10^4$ | Stiffness per unit length for Constant Thickness Bellows As Described Above |
| $E(x) := E_0$ | | Bellows Stiffness as a function of Length |
| $E(1) = 1.4105 \times 10^4$ | | Bellows Equivalent End Stiffness |

TABLE 1-continued

Baseline Stress Computations

Numerical Solution of Boundary Value Problem, After Assumption of Harmonic Excitation Given
$u''(x) \cdot E(x) + \rho_\omega \cdot u(x) = 0$
$u(0) = 0$      $u(l) = .005$      Boundary Values $\left(\left|\frac{E(1)}{E_0}\right|\right)^{.33} = 1$      Bellows Moving End Thickness, Relative to Fixed End Thickness (Stiffness is proportional to thickness cubed)

Figure 5:
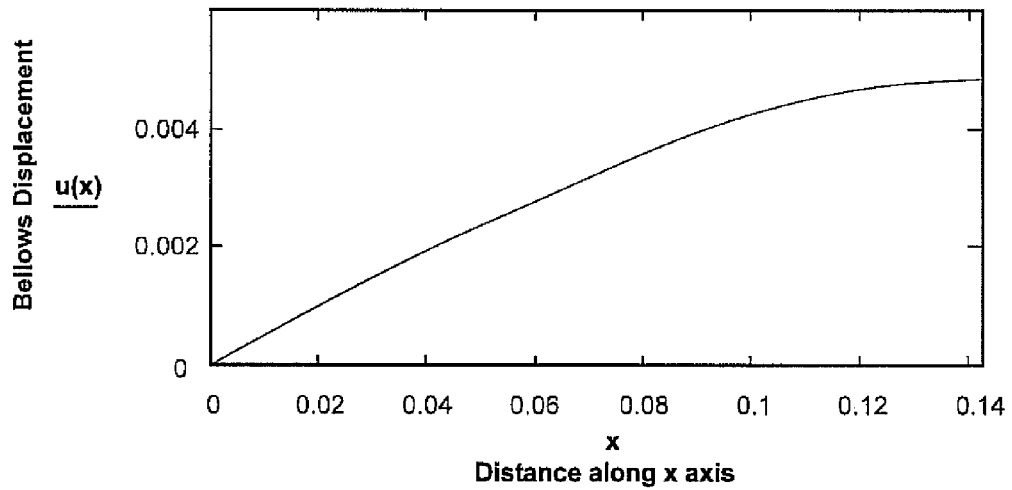
FIG. 5 is a graph showing bellows displacement versus position along the bellows.
Figure 6:
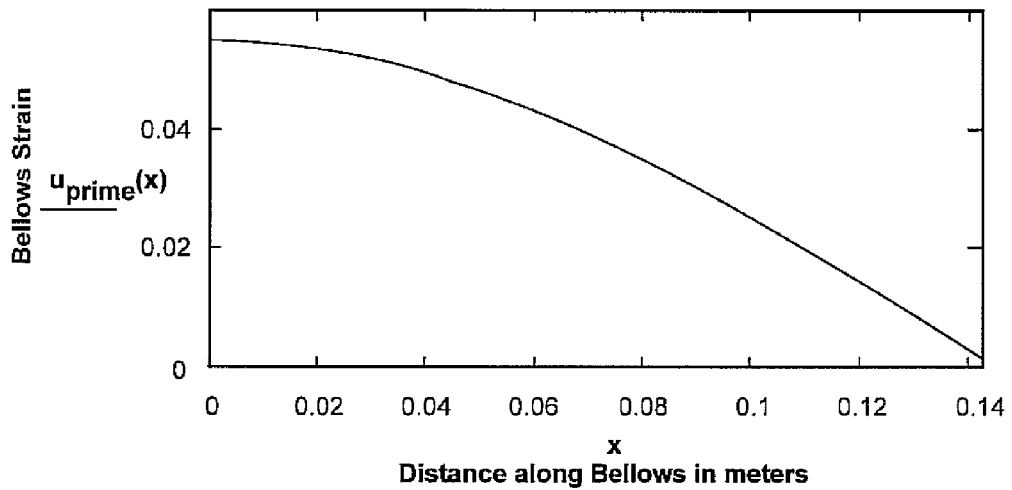
FIG. 6 is a graph showing bellows strain versus position along the bellows.

$u := \text{Odesolve}(x, .3, 10000)$      $x := 0, .0001 .. (0.2)$ $u_{prime}(x) := \frac{u(x + .0001) - u(x)}{.0001}$      Numerical Computation of Strain $u_{prime}(0) = 0.0544968$      Strain at Fixed End of Bellows Note: u is variable to describe displacement here Using the data from Table 1, the bellows displacement and strain can be plotted versus the position along the bellows length. The displacement is shown in FIG. 5 and the normalized strain is shown in FIG. 6. As shown previously, the optimal bellows length results in the maximum stress at the fixed end at the attachment point, and this stress decreases in a cosine shaped curve to the end of the bellows. The normalized strain reaches a peak value at the fixed end, with a value of 0.0545, as shown in Table 1.

Bellows with Linearly Varying Stiffness

Figure 7:
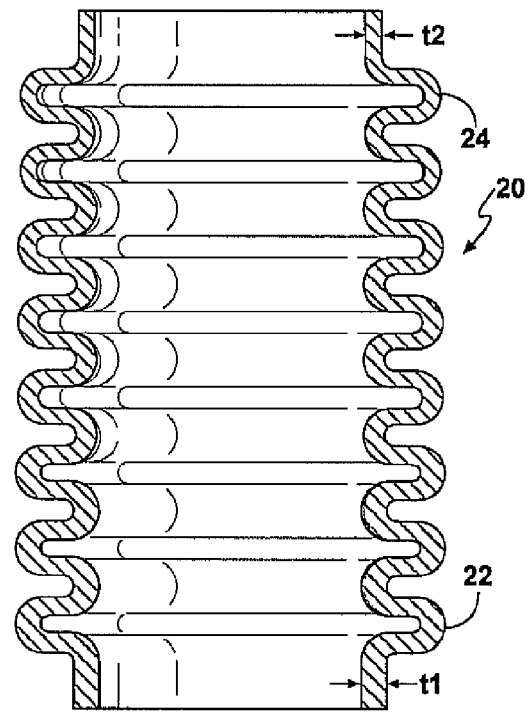
FIG. 7 is a cross-sectional view of a bellows according to an embodiment of the present invention with a wall thickness that varies.

We turn now to a bellows according to one embodiment of the present invention with linearly varying stiffness. As shown in FIG. 7, the bellows 20 has a wall thickness t1 at a first end 22 that is thicker than the wall thickness t2 at a second end 24. As one example, the wall thickness at the fixed end may be the same as the wall thickness of the bellows of Table 1, and the material thickness t decreases as $x^{1/3}$ toward the moving end, where it has half the thickness of the fixed end. The thicknesses are exaggerated in FIG. 7, since the exemplary thickness and decrease would not be visible in such a Figure without exaggeration. The thickness change results in a linearly decreasing stiffness profile, in distance along the axis, and a mass per unit length along the axis that changes as the thickness. The generalized stiffness is given by the variable E(x). In order to implement equation (A.3) with these variable coefficients, we require the derivative of the stiffness as a function of the length (given there as $E_{prime}(x)$). Exemplary calculations for such a bellows is provided in Table 2. "Normalized Stress" for this example is defined as calculated strain times thickness, with unit thickness assumed at the fixed end attachment, since for purposes of comparison all cases are the same at the fixed end (where the displacement is zero). Normalized stress expressed in this way is in keeping with the form of (A.11), since it can be seen that stress is proportional to the product of strain and thickness, and the other parameters are treated as constant. In this manner, the improvements realized by the approach taken in the exemplary embodiments will be directly observable numerically.

TABLE 2

Bellows With Continuously Variable Stiffness and Density

Normalized Data for 6 inch 1D, 7 3/16 OD 8 convolution 0.016 inch thick bellows $k := 566 \cdot \frac{4.45}{.0254}$      Bellows Equivalent Overall Stiffness $l := 5.6 \cdot .0254$      $l = 0.1422$      Bellows Overall Length (meters)

$m := \frac{1.33}{2.204}$      Overall Bellows Mass (kg)

$\omega := 2 \cdot \pi \cdot 100$      Operating Frequency (rad/sec)

$\rho_\omega := \left(\frac{m}{l}\right) \cdot \omega^2$      Mass per unit length* omega^2

$E_0 := k \cdot l$      $E_0 = 1.4105 \times 10^4$      Stiffness per unit length for Constant Thickness Bellows As Described Above $E_1 := -87000$      $E_2 := -0000$      $E_3 := 00000$      Terms for Polynomial Expansion In Bellows Equivalent Stiffness: Note linear decrease in Stiffness as a function of length $E(x) := E_0 + E_1 \cdot x + E_2 \cdot x^2 + E_3 \cdot x^3$      Bellows Stiffness as a function of Length
$E(1) = 1.7298 \times 10^3$      Bellows Equivalent End Stiffness
$E_{prime}(x) := E_1 + 2E_2 \cdot x + 3E_3 \cdot x^2$      Spatial Derivitive of Stiffness as a function of Length TABLE 2-continued Bellows With Continuously Variable Stiffness and Density Numerical Solution of Boundary Value Problem, After Assumption of Harmonic Excitation Given $$u''(x) \cdot E(x) + u'(x) \cdot E_{prime}(x) + \rho_\omega \cdot \left(\left|\frac{E(x)}{E_O}\right|\right)^{\frac{1}{3}} \cdot u(x) = 0 \quad \text{Note Density Variation With thickness}$$

$u(0) = 0 \qquad\qquad u(1) = .005 \qquad$ Boundary Values $\left(\left|\frac{E(1)}{E_0}\right|\right)^{.33} = 0.5003 \qquad$ Bellows Moving End Thickness, Relative to Fixed End Thickness (Stiffness is proportional to thickness cubed)

Figure 8:
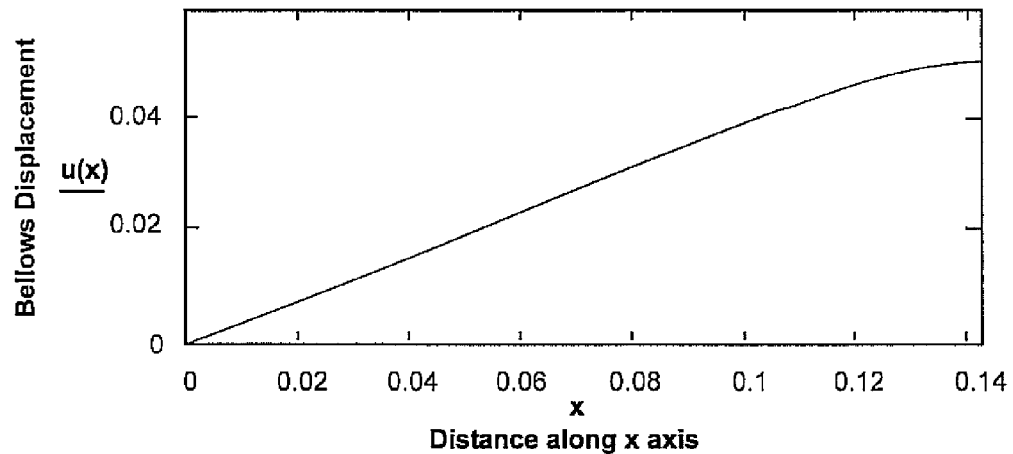
FIG. 8 is a graph showing bellows displacement versus position along the bellows.
Figure 9:
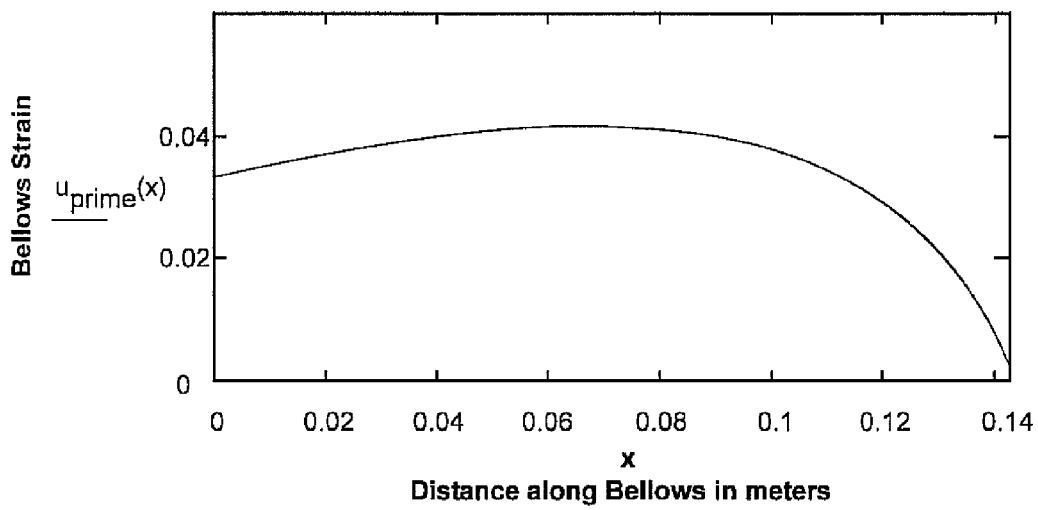
FIG. 9 is a graph showing bellows strain versus position along the bellows.
Figure 10:
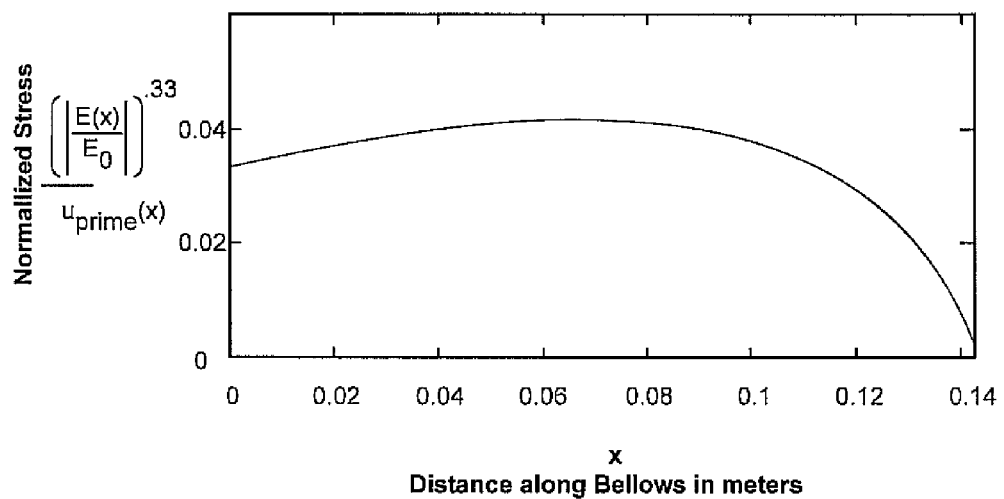
FIG. 10 is a graph showing normalized stress versus position along the bellows.

$u := \text{Odesolve } (x, .3, 10000) \qquad x := 0, .0001 .. (0.2)$ $u_{prime}(x) := \dfrac{u(x + .0001) - u(x)}{.0001} \qquad$ Numerical Computation of Strain $u_{prime}(0) = 0.0333004 \qquad$ Strain Fixed End of Bellows Note: u is variable to describe displacement here For the bellows 20, with the dimensions provided in Table 2, the displacement is shown in FIG. 8, the strain is shown in FIG. 9, and the normalized stress is shown in FIG. 10. As shown in FIG. 10, the maximum stress in the bellows 20, given by the product of the local strain and the local stiffness, no longer occurs at the fixed end, but at some intermediate point. One may note that the maximum normalized stress for this example is 0.0364, which is substantially improved over the values in Table 1, for a constant stiffness and thickness bellows 20. The stresses are ⅔ of the value seen in the Table 1. For this type of bellows, pressure stresses increase roughly as the square of the bellows thickness, and they too produce meridional bending stresses. As such, it may be attractive to have a profile which is not able to achieve constant stress throughout the length of the bellows, but wherein the stress decreases as one moves toward the moving end. This may provide some compensation for the increasing pressure stresses due to thinning of the formed bellows. The stress profile can be tailored, depending on the requirements, with suitable weighting and adjustment of the equivalent stiffness function which can be a polynomial expansion. Numerical evaluation shows that a linearly varying thickness performs better than a constant thickness bellows, but does not perform as well as the thickness profile in the example illustrated here. However, a linear varying thickness falls within the scope of the present invention.

Bellows with Incremental Stiffness and/or Density Variation

Figure 12:
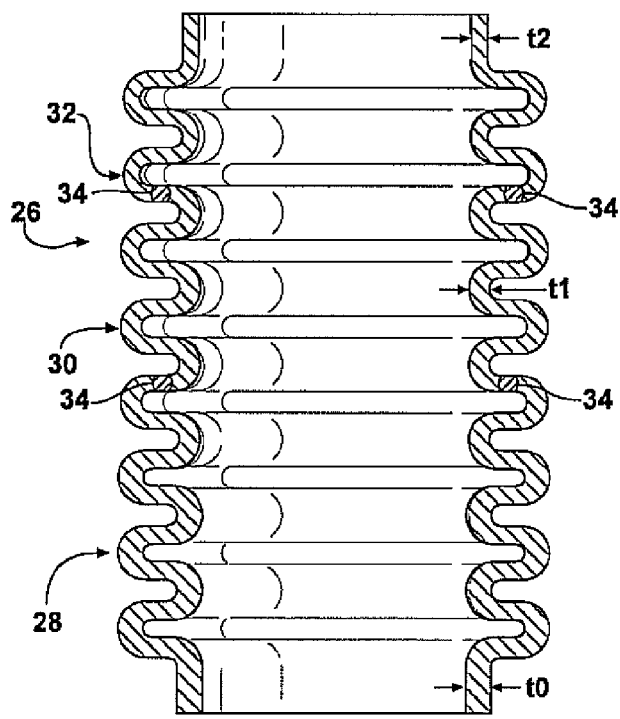
FIG. 12 is a cross-sectional view of a bellows according to another embodiment of the present invention, wherein different sections are joined end to end and have different thicknesses.

According to a further embodiment of the present invention, a bellows may be constructed with incremental stiffness and/or density variation. The bellows of FIG. 7 presents some difficulty in fabrication. Sheet material with a variable thickness profile for forming bellows 20 may not be readily available at low cost, at least in metallic materials. In this further exemplary embodiment of a bellows, the model consists of three sections of material of constant thickness, joined by welding or other processes. However, more or fewer sections may be used. Such a bellows 26 is shown in FIG. 12. This bellows has a first section 28, a second section 30, and a third section 32, joined longitudinally end to end. The first section has a thickness $t_0$, the second section has a thickness $t_1$ that is less than $t_0$, and the third section has a thickness t2 that is less than $t_1$.

Figure 11:
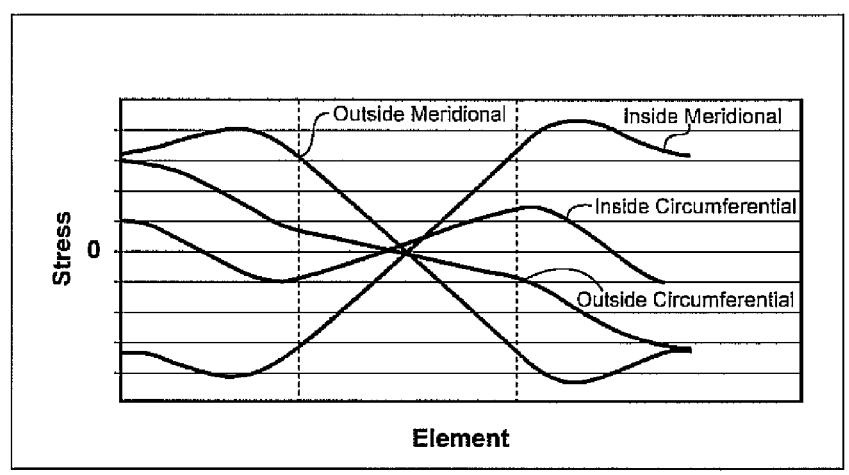
FIG. 11 is a graph showing bending stresses in a bellows.

It is known in formed bellows that the dominant stress, namely the meridional bending stress, has a zero crossing roughly midway between the crest and the root of the convolution. The bending stress associated with deflection of a bellows is illustrated in FIG. 11 (adapted from C. Becht, IV, "The Effect of Bellows Convolution Profile On Stress Distribution And Plastic Strain Concentration", *Fitness For Service, Stress Classification and Expansion Joint Design*, PVP-Vol 401,p 201-209, (American Society of Mechanical Engineers 2000)). The profiles show modeled stresses from one crest to one root in a formed bellows; the section between the dashed lines indicates the 'flat' portion of the convolution which has no curvature and is perpendicular to the compression axis of the formed bellows. Since this is a location of minimum bending stress associated with deflection, a joining weld may be placed in the material such that the weld will find this location during the forming operations, although the exactly optimal location of the placement of the weld within the convolution profile will be influenced by the relative thicknesses of the material. In some embodiments of the present invention, a joining weld is disposed in the "flat portion" of the convolutions, and may be positioned approximately halfway between the crest and root of the convolutions. Examples of such weld joints 34 are shown in FIG. 12.

Figure 13:
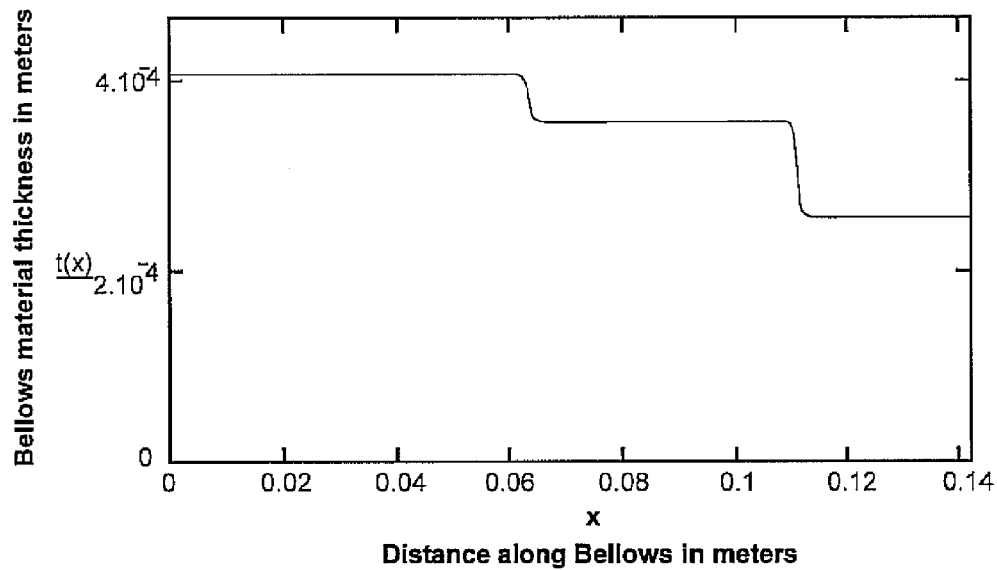
FIG. 13 is a graph showing bellows thickness versus position along the bellows.

Table 3 provides exemplary calculations for a bellows with incremental thickness changes according to an embodiment of the present invention. As before, the derivative of the stiffness of the bellows as a function of length is required, and a sharp discontinuity would produce a function which is numerically not possible to evaluate. A smoothing function has been applied, which in practice would be associated in part with the weld bead transition and smoothing provided by a planishing operation, as is typically performed on the longitudinal weld for conventional bellows formed of sheet material. For this example, modest iterative adjustments have been made in the relative thicknesses of the material, and transition locations to make the peaks in the stress profile approximately equal and of a magnitude which has a normalized value of 0.038, or 70% of the value shown in FIG. 6. The effective thickness profile of the material as a function of length is shown in FIG. 13. In this example, practical thickness increments for material were chosen, which are commercially available in sheet metal.

TABLE 3

Bellows With Incremental Stiffness/Density Variation

Normalized to Data for 6 inch ID, 7 3/16 OD, B convolution, 0.016 inch thick bellows at attachment, stepping down to .014 inch thick and .010 inch thick.

$k := 566 \cdot \dfrac{4.45}{.0254}$   Bellows Equivalent Overall Stiffness $I := 5.6 \cdot .0254$    $I = 0.1422$    Bellows Overall Length (meters)

$l_1 := \left(\dfrac{4}{9}\right) \cdot 1$    First Thickness Transition $l_2 := \left(\dfrac{7}{9}\right) \cdot 1$    Second Thickness Transition Overall Bellows Mass (kg)

$m := \dfrac{1.33}{2.204}$ $\omega := 2 \cdot \pi \cdot 100$    Operating Frequency (rad/sec)
$w_t := .00039$    Weld Transition Parameter $\rho_\omega := \left(\dfrac{m}{I}\right) \cdot \omega^2$    Mass per unit length* omega^2

Equivalent Stiffness, Thickness of Nominal Bellows Set Up of Differential Equation $E_0 := k \cdot 1$
$E_0 = 1.4105 \times 10^4$
$t_0 := .016 \cdot .0254$    Bellows Initial Thickness (meters)
$t_1 := .875 t_0$    $t_1 = 3.556 \times 10^{-4}$    Bellows Thickness for mid-section
$t_2 := .625 \cdot t_0$    $t_2 = 2.54 \times 10^{-4}$    Bellow Thickness at End Section (Near Moving End)

Create Stepwise Thickness Profile $$t(x) := \left[\dfrac{(t_0 - t_1)}{e^{\frac{(x-l_1)}{w_t}} + 1}\right] + \left[\dfrac{(t_1 - t_2)}{e^{\frac{(x-l_2)}{w_t}} + 1}\right] + t_2$$

$E(x) := E_0 \cdot \left(\dfrac{t(x)}{t_0}\right)^3$    Expression of Bellows Convolution Equivalent Stiffness As a Function of Length: Stiffness is proportional to the material thickness cubed

Derivitive of Stiffness as a Function of Length (Line Break Dummy Variable)

$$D(x) := \left[\dfrac{-(t_0 - t_1)}{\left[\exp\left[\dfrac{(x-l_1)}{w_t}\right] + 1\right]^2 \cdot w_t} \cdot \exp\left[\dfrac{(x-l_1)}{w_t}\right] - \dfrac{(t_1 - t_2)}{\left[\exp\left[\dfrac{(x-l_2)}{w_t}\right] + 1\right]^2 \cdot w_t} \cdot \exp\left[\dfrac{(x-l_2)}{w_t}\right]\right]$$

$$E_{prime}(x) := \left[3 \cdot E_0 \cdot \dfrac{\left[\dfrac{(t_0 - t_1)}{\left[\exp\left[\dfrac{(x-l_1)}{w_t}\right] + 1\right]} + \dfrac{(t_1 - t_2)}{\left[\exp\left[\dfrac{(x-l_2)}{w_t}\right] + 1\right]} + t_2\right]^2}{t_0^3}\right] \cdot D(x)$$

Numerical Solution of Boundary Value Problem, After Assumption of Harmonic Excitation:

Given $$u''(x) \cdot E(x) + u'(x) \cdot E_{prime}(x) + \rho_\omega \cdot \left(\left|\dfrac{E(x)}{E_0}\right|\right)^{\frac{1}{3}} \cdot u(x) = 0$$

Figure 14:
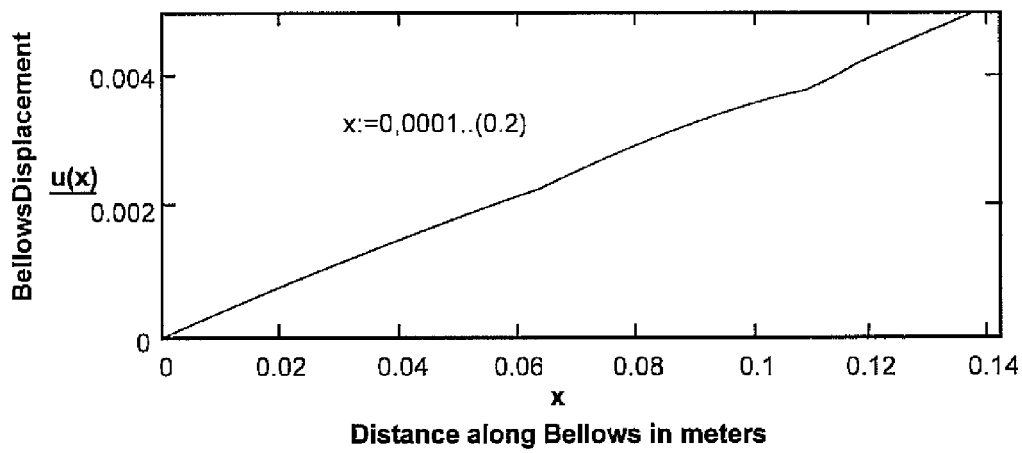
FIG. 14 is a graph showing bellows displacement versus position along the bellows.
Figure 15:
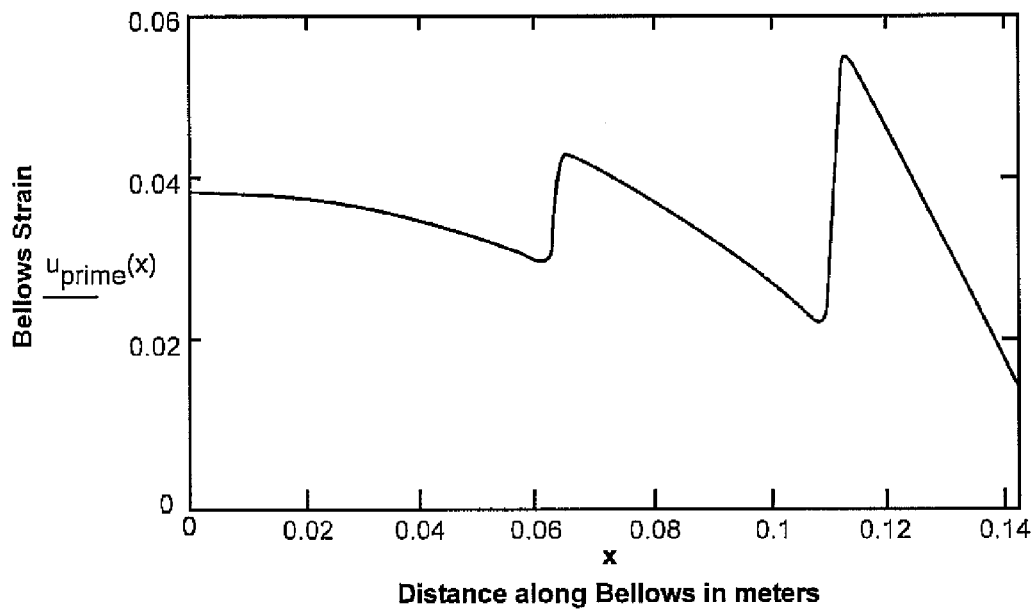
FIG. 15 is a graph showing bellows strain versus position along the bellows.
Figure 16:
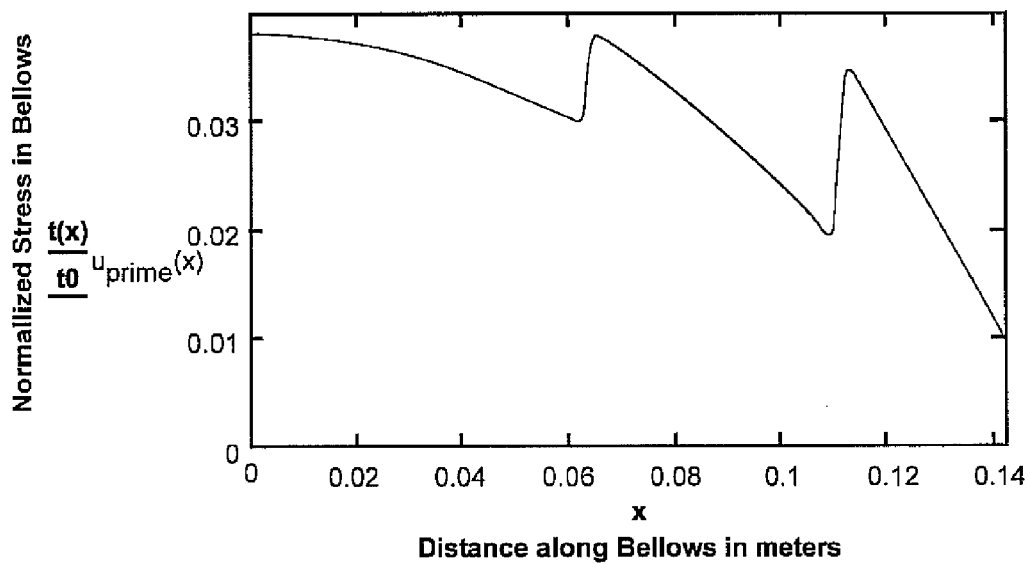
FIG. 16 is a graph showing normalized stress versus position along the bellows.

$u(0) = 0$        $u(I) = .005$        Boundary Values
$u := \text{Odesolve}(x, .2, 20000)$        $x := 0, .0001 .. (0.2)$ $u_{prime}(x) := \dfrac{u(x + .0001) - u(x)}{.0001}$    Numerical Evaluation of Strain in Bellows $u_{prime}(0) = 0.0383132$    Strain at Fixed End of Bellows FIG. 14 provides bellows displacement versus position along the length for the example of Table 3, and FIG. 15 provides bellows strain versus position. FIG. 16 provides the normalized stress profile.

As will be clear to those of skill in the art, any number of other incremental changes to the bellows geometry could be made. For analysis purposes, the incremental changes should be able to be sufficiently described mathematically. For example, the sections of the bellows may each have their own pitch, thickness and convolution height, as long as a reasonable mathematical joining condition can be composed, of the sort seen in the above example.

Figure 17:
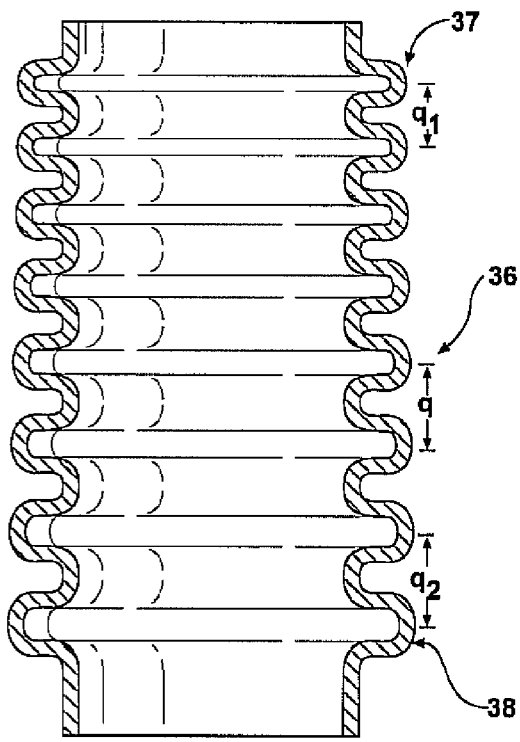
FIG. 17 is a cross-sectional view of a bellows according to another embodiment of the present invention wherein the convolution spacing changes from end to end.

One of skill in the art will appreciate that the stiffness and/or linear density may be altered in other ways, either continuously or incrementally. FIG. 17 illustrates a bellows 36 wherein the convolution pitch, q, varies along the length. At one end 37 the pitch is $q_1$, and at the other end 38 the pitch is $q_2$, which is greater than $q_1$. The pitch may vary continuously, or incrementally, though it is preferred that it vary generally monotonically so that the stiffness and/or linear density varies generally monotonically.

Figure 18:
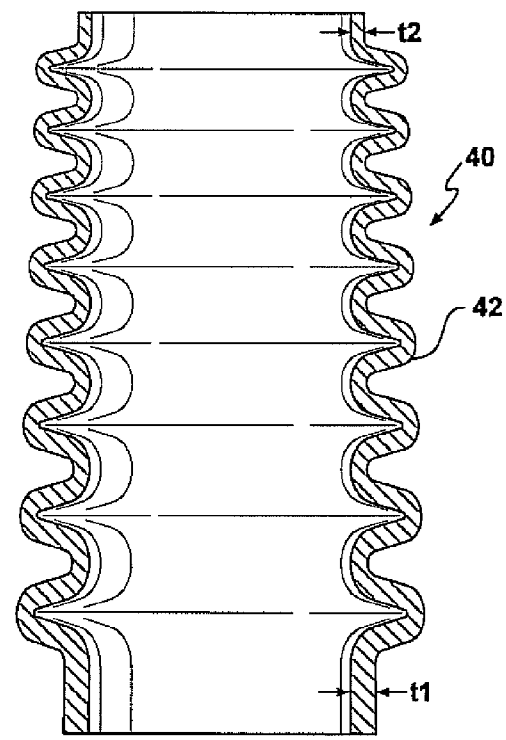
FIG. 18 is a cross-sectional view of a bellows according to an alternative embodiment of the present invention wherein the convolutions have an alternative shape.

The bellows may also have convolutions with shapes or profiles different than illustrated so far. As one example, FIG. 18 shows a bellows 40 wherein the outer ends 42 of the convolutions have sharper transitions than in the prior versions. This is just one example. Other examples will be clear to those of skill in the art. The bellows 40 also has a wall thickness that varies between a thick wall $t_1$ and a thin wall $t_2$, with the thicknesses being exaggerated in the drawings.

Figure 19:
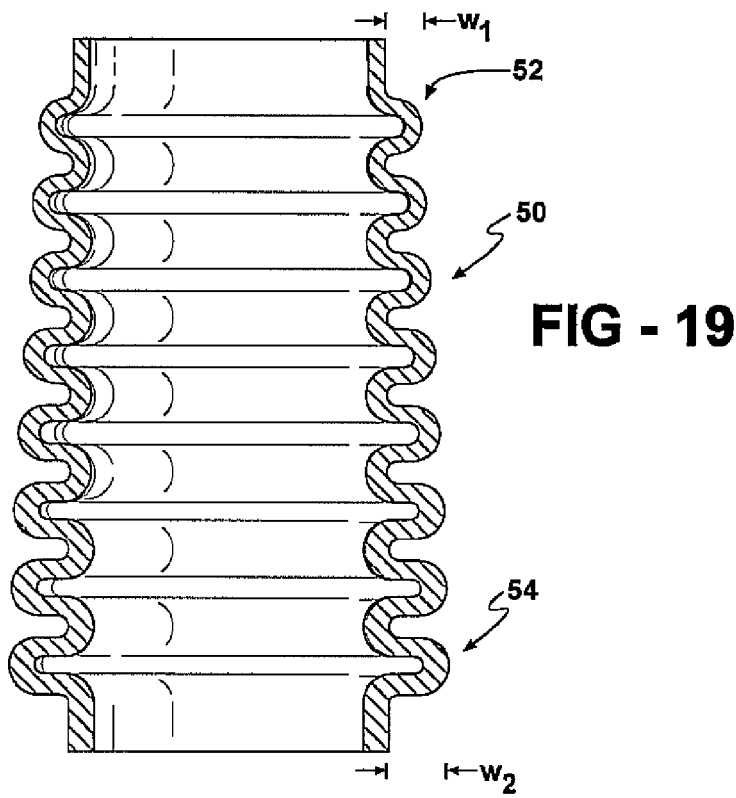
FIG. 19 is a cross-sectional view of a bellows according to yet another embodiment of the present invention wherein the convolution height or span varies along the length of the bellows.

One of skill in the art can examine equations (A.11) and (A.12) and note that for a formed bellows, by increasing the convolution height or span, w, towards the moving end, one can also produce a bellows with a compliance which increases as one moves toward the piston (moving end). This is a further alternative to varying the thickness. FIG. 19 shows such a bellows 50. The bellows 50 has a convolution height or span that varies from $w_1$ at one end 52 to at the other end 54. Such a solution obviates the need for variable thickness material or additional welds. From a performance point of view, this method offers more modest improvement over a conventional bellows, because increasing compliance comes at the cost of increasing linear mass density, since taller convolutions carry more material.

As a further alternative, a bellows may combine any of the approaches discussed above, so as to vary the stiffness and/or linear mass density along the length of the bellows.

Hoop-Stack Bellows

Figure 20:
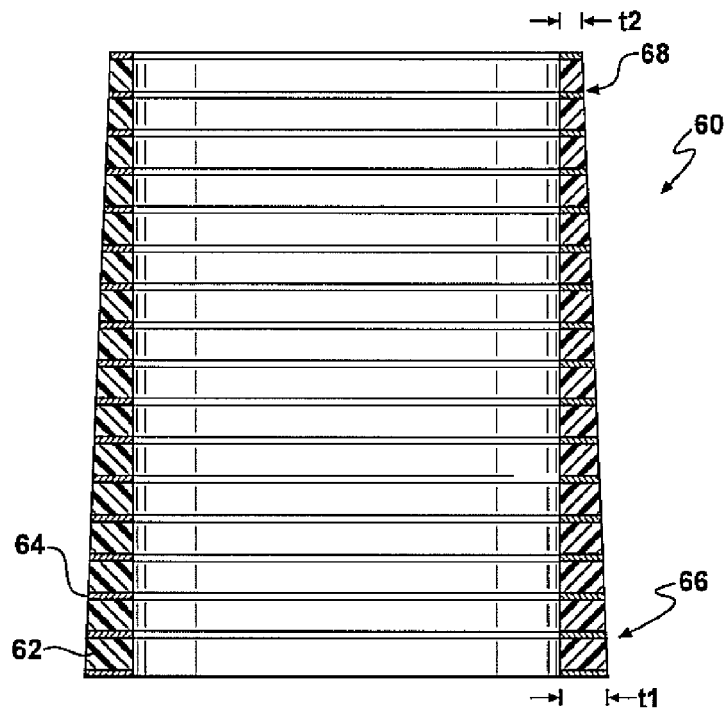
FIG. 20 is a cross-sectional view of a bellows according to yet another alternative embodiment of the present invention wherein the bellows is generally tubular.

As discussed previously, a bellows according to the present invention may take forms other than a traditional bellows with convolutions. According to yet another embodiment of the present invention, such a bellows may take the form shown in FIG. 20. The bellows 60 is generally tubular and has a layered structure. In one embodiment, the bellows has lamina perpendicular to the axis of compression, consisting of alternating high compliance and low compliance layers. The high compliance layers 62 may be elastomeric layers, to provide axial compliance. The low compliance layers 64, such as metal hoops, may have high resistance to internal and external pressure. In one example, the low compliance layers are flat aluminum hoops. Other materials, for this and other embodiments, include but are not limited to composites, thermoformed plastics and thermo-set plastics. The low compliance layers provide resistance to pressure loads, which are transmitted from the elastomeric rings to the hoops via shear. The layers may be bonded to each other with a suitable adhesive or other bonding arrangement. Naturally, the bellows has an internal diameter and an outside diameter, and the shape for this example may be generally cylindrical.

Figure 21:
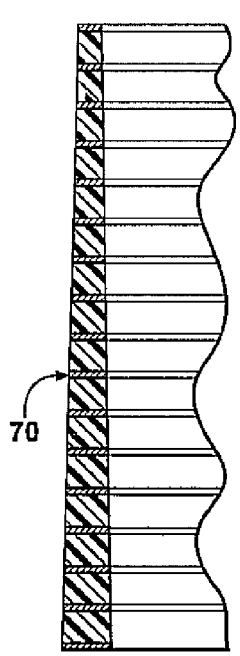
FIG. 21 is a cross-sectional view of a portion of the bellows wall showing an alternative configuration.

As with the earlier embodiments, the bellows preferably has a stiffness and/or linear mass density that varies monotonically, either continuously or incrementally, between the ends. This variation may be accomplished in several ways, as will be clear to those of skill in the art. The bellows 60 has a wall thickness that varies between t1 at one end 66 and t2 at the other end 68. In this embodiment, the inner surface is cylindrical, and the outer surface is tapered. FIG. 21 illustrates a portion of a bellows wall 70 wherein the inner and outer surfaces both taper.

Figure 22:
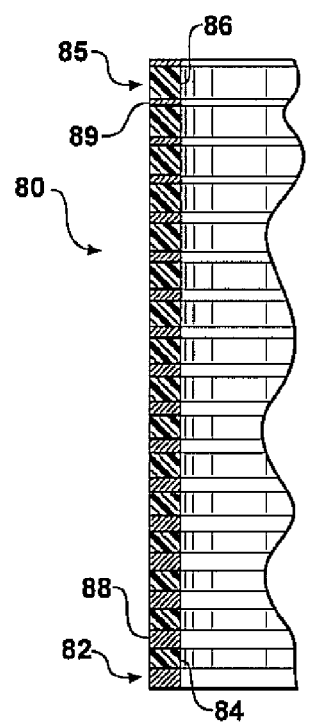
FIG. 22 is a cross-sectional view of a portion of a bellows wall showing yet another alternative configuration.

An alternative approach is to vary the thicknesses of the layers. FIG. 22 shows a portion of a bellows 80 wherein the high compliance layers vary from thin to thick, and the low compliance layers vary from thick to thin. For example, at one end 82, the high compliance layer 84 is relatively thin, while at the other end 85, the high compliance layer 86 is thicker. The low compliance layer 88 at the one end 82 is relatively thick while the low compliance layer 89 at the other end 85 is thinner.

Figure 23:
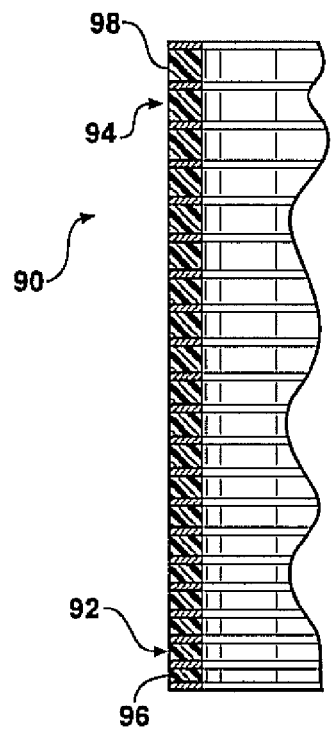
FIG. 23 is a cross-sectional view of a portion of a bellows wall showing a further alternative configuration.

FIG. 23 shows a simpler alternative wherein the variation in properties is provided by changing the height of the elastomeric material, and keeping the thickness of the aluminum hoops fixed. As shown, the bellows wall 90 has opposed ends 92 and 94. The elastomeric material layer 96 near the end 92 is thinner than the elastomeric layer 98 near the other end 94. This particular example will be used to provide sample calculations and to illustrate some of the interaction between the pressure and deflection stresses, and how a designer may approach these considerations. In the design example chosen, a particular value of pressure and maximum interface shear stress are implicit in the dimensions selected, the exact values of which are peripheral to the conceptual thrust. Values and calculations are provided in Table 4.

TABLE 4

Examination of Variable Hoop-stack Bellows Done via varying thickness of elastomer layer only (fixed height elastomer layers)

Begining point will be assumption that max height is controlled by pressure (interface shear) that therefore the tailoring will be done to stiffen by thinning the layer height near the fixed end. Treat per unit area (m^2) of bellows material

| | |
|---|---|
| Elastomer Free Youngs Modulus | $Ee := 1.54 \times 10^6 \cdot Pa$ |
| Elastomer, Hoop Density | $\rho_e := 1100 \frac{kg}{m^3}$  $\rho_h := 2700 \frac{kg}{m^3}$ |
| Max elastomer height | $h_{max} := .160\ n$ |
| Elastomer thickness | $t := 0.181\ in$ |
| Minimum elastomer height | $h_{min} := h_{max} \cdot (.5)$ |
| Ring Height | $h_h := 0.040\ in$ |
| Bellows height | $\underline{h} := 8 \cdot 0.0254$   Leaving non dimensional |

TABLE 4-continued

Examination of Variable Hoop-stack Bellows Done via varying
thickness of elastomer layer only (fixed height elastomer layers)

Elastomer profile (This can be tailored--only has to be mathematical differentiable if want
to use continuous differential equation solver)

$$h(x) := h_{min} + (h_{max} - h_{min}) \cdot \left(\frac{x}{L}\right)^2 \qquad h(L) = 4.064 \times 10^{-3} \, m$$

Effective modulus of elastomer/stack as a function of position $$E(x) := \left[\left(\frac{4}{3}\right) + \left(\frac{t}{h(x)}\right)^2 \cdot \frac{1}{3}\right] \cdot \frac{h(x) + h_h}{h(x)} \cdot E_e$$

Effective local density $$\rho(x) := \left(\frac{h(x) \cdot \rho_e + h_h \cdot \rho_h}{h(x) + h_h}\right)$$

Temporarily non-dimensionalize E(x)

$$E_n(x) := E(x) \cdot \frac{1}{Pa} \qquad \rho_n(x) := \rho(x) \cdot \frac{m^3}{kg} \qquad \omega_n := \omega \cdot s$$

Given $$\frac{d^2}{dx^2}\xi(x) \cdot E_n(x) + \frac{d}{dx}\xi(x) \cdot \frac{d}{dx}E_n(x) + \omega_n^2 \cdot \rho_n(x) \cdot \xi(x) = 0$$

$\xi(0) = 0$ \qquad $\xi(L) = 0.010$ \qquad Boundary Values for displacement $\xi :=$ Odesolve(x, L· 1.1, 2000) \qquad This $\xi$ represents displacement $$\varepsilon_M(x) := \frac{d}{dx}\xi(x)$$

Local Strain is equal to derivitive with respect to displacement x := 0, .001..L \qquad $\epsilon(.0001) = 0.048$ \qquad $\epsilon_u(.0001) = 0.077$
Average Elastomer Strain $$\varepsilon_{ue}(x) := \varepsilon_u(x) \cdot \frac{h(L) + h_h}{h(L)} \qquad \varepsilon_e(x) := \varepsilon_u(x) \cdot \frac{h(x) + h_h}{h(x)} \qquad \frac{h(0)}{h(L)} = 0.5$$

$E_e(.0001) = 0.072$ \qquad $\epsilon_{ue}(.0001) = 0.096$
Peak Local Deflection Strain $$\varepsilon_{up}(x) := \varepsilon_u(x) \cdot \left(\frac{h(L) + h_h}{h(L)}\right) \cdot 3 \cdot \left(\frac{t}{h(L)}\right) \qquad \varepsilon_p(x) := \varepsilon(x) \cdot \left(\frac{h(x) + h_h}{h(x)}\right) \cdot 3 \cdot \left(\frac{t}{h(x)}\right)$$

Peak Local Deflection Strain+Pressure strain \qquad $p_e := .6$ $$\varepsilon_{Mup}(x) := \varepsilon_u(x) \cdot \left(\frac{h(L) + h_h}{h(L)}\right) \cdot 3 \cdot \left(\frac{t}{h(L)}\right) + p_e \qquad \varepsilon_{Mp}(x) := \varepsilon(x) \cdot \left(\frac{h(x) + h_h}{h(x)}\right) \cdot 3 \cdot \left(\frac{t}{h(x)}\right) + \left(\frac{h(x)}{h(L)}\right) \cdot p_e$$

$e_{up}(0.0001) = 0.927$ \qquad $e_p(.0001) = 0.789$ \qquad $\frac{\varepsilon_p(0.0001)}{\varepsilon_{up}(0.0001)} = 0.85$ In the example in Table 4, it can be seen that a value of the modulus of the elastomer has been chosen—in this case comparable with a natural rubber with a durometer of approximately 40. The density of the hoops and the elastomer follow within the Table. The density chosen for the hoops (2700 kg/m³) corresponds to that of aluminum; generally in the Table, parameters associated with the hoops (the very low compliance lamina) are written with h as a subscript. The elastomer 'thickness' in the Table shall mean the difference between the inside diameter and the outside diameter of the bellows. The elastomer maximum height, in this case is a value determined by the pressure stresses that the elastomer can successfully transmit to the aluminum hoops without problems associated with excessive interface stress. "Minimum Elastomer height" here, is a parameter to be optimized for the operation of the bellows—a factor of ½ of the maximum has been chosen for simplicity in this example and further refinement can be obtained. An "elastomer profile" is given in this example; in this particular case, again for simplicity in illustrating the approach, a parabolic height profile has been chosen, with the elastomer increasing in height by a factor-of-two over the length of the bellows. Clearly, any function, which can be mathematically described in at least an approximately continuous fashion could be used, as illustrated in the previous example. Even with such fairly simple illustrative approaches, it will be seen that the bellows is improved, and further improvement is possible.

Figure 24:
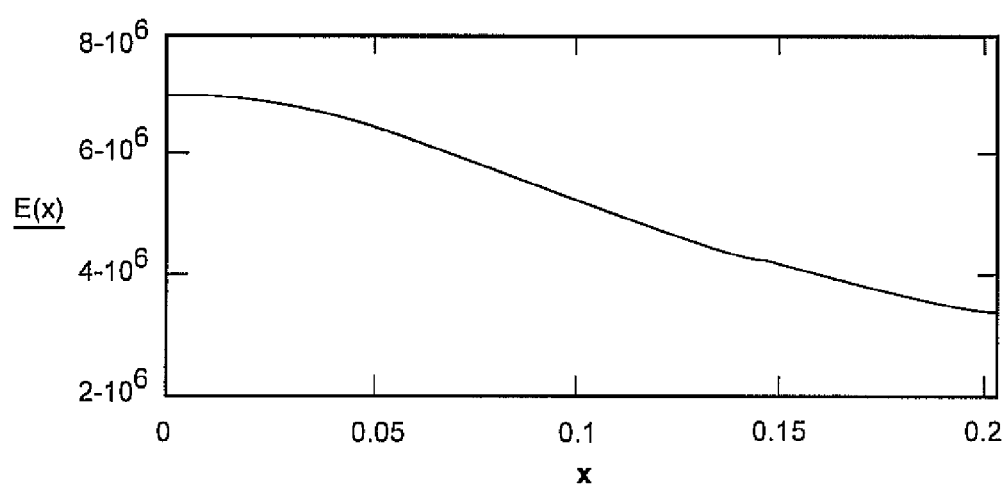
FIG. 24 is a graph showing effective modulus versus position along the bellows.
Figure 25:
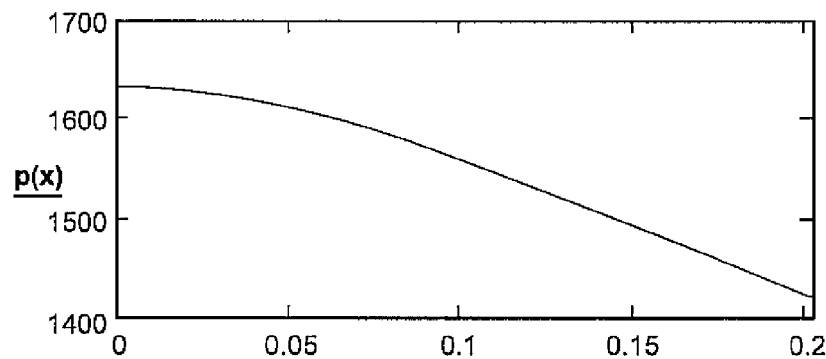
FIG. 25 is a graph showing density versus position along the bellows.

In keeping with the method described above, we must find the stiffness as a function of length. In this particular type of design, one must be aware that the effective modulus of the bellows is a function of the aspect ratio (height to thickness ratio) bellows type. Details on this can be found in A. N. Gent and P. B. Lindley, "The Compression of Bonded Rubber Blocks", Proc. Inst. Mech. Eng. (London) Vol 173, No. 3, pg 111-122. (1959). When an elastomer is bonded to a non-compliant material, it can be shown that in compression and tension, the effective modulus of the elastomer is a function of the aspect ratio (thickness to height ratio.) Further, the local bellows stiffness depends on the fraction of material (in this case the aluminum hoops) which have effectively infinite relative stiffness in comparison with the fraction which is elastomeric. These two features are incorporated in the formulation described as the "Effective modulus of elastomer/stack as a function of position" in the design example, and is plotted in FIG. 24. A similar density profile is also constructed within the Table and plotted in FIG. 25.

To proceed further, we must next choose an operating frequency, here chosen as 60 Hz, for purposes of illustration.

Given these results, application of Newtons second law to differential elements along the bellows, and assumption of harmonic motion of one of the ends, produces the differential equation indicated in terms of x(x), the displacement of each section, which is subject then to boundary conditions—zero displacement at the fixed end and a finite time harmonic displacement at the moving end.

Figure 26:
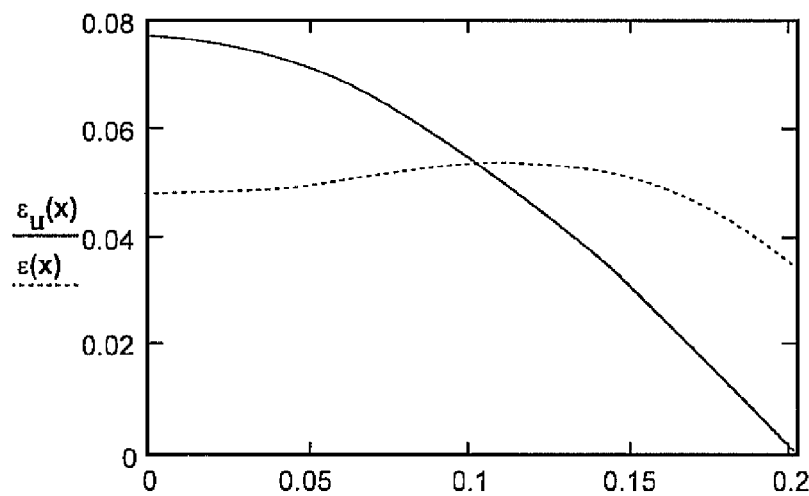
FIG. 26 is a graph showing strain versus position along the bellows.

FIG. 26 shows the improvement in the strain, the dashed case representing the case with tailored stiffness and the solid line represents that with a uniform bellows (i.e. constant height elastomer layers). Here we can see the type of reduction in strain already illustrated in the previous design examples. In this, and all examples which follow, the values with a subscript u will refer to a reference uniform bellows calculations, provided to use only as a basis for comparison to judge the relative sizes of strains and the design benefit conveyed.

Figure 27:
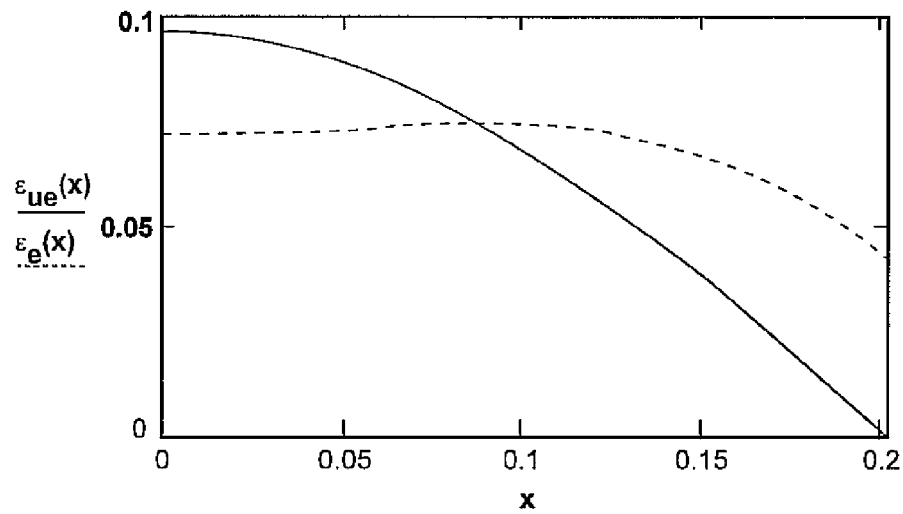
FIG. 27 is a graph showing elastomer strain versus position along the bellows.

From this point, one must now consider the details of the construction. Because a constant local strain would not represent a constant local stress in such a structure, one must convert this strain back to the strain experienced by the elastomer, since the hoops experience no significant strain. This effect is illustrated in FIG. 27.

Figure 28:
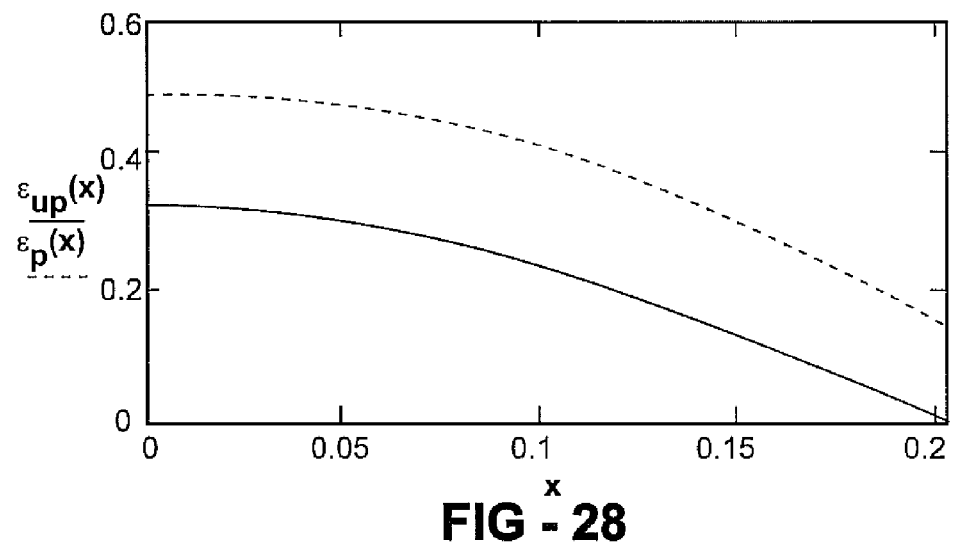
FIG. 28 is a graph showing strain versus position along the bellows.

Now, a peculiarity of this type of structure can enter. It can be shown that a localized strain concentration occurs in the rubber in such a compressed and expanded structure, which also depends on the aspect ratio of the elastomer. In some cases this peak local stress will govern the design, but it may not always, and this depends on the details of the material and construction. But for purposes of illustration, we shall assume it does in this case, and this strain concentration is calculated in the parameter labeled $e_p(x)$, with the equation given in the Table. This calculation represents the strain at the location of maximum shear, near the interface of the lamina, associated with the constraint provided by the bonding at the interface, and the fact that the rubber material will conserve its volume. When this peak strain is calculated as described here, the peak local deflection strain, as a function of position is actually higher than the uniform bellows case; in the absence of a means to ameliorate this effect it would appear that this approach has yielded a lower performing bellows. This is shown in FIG. 28.

Figure 29:
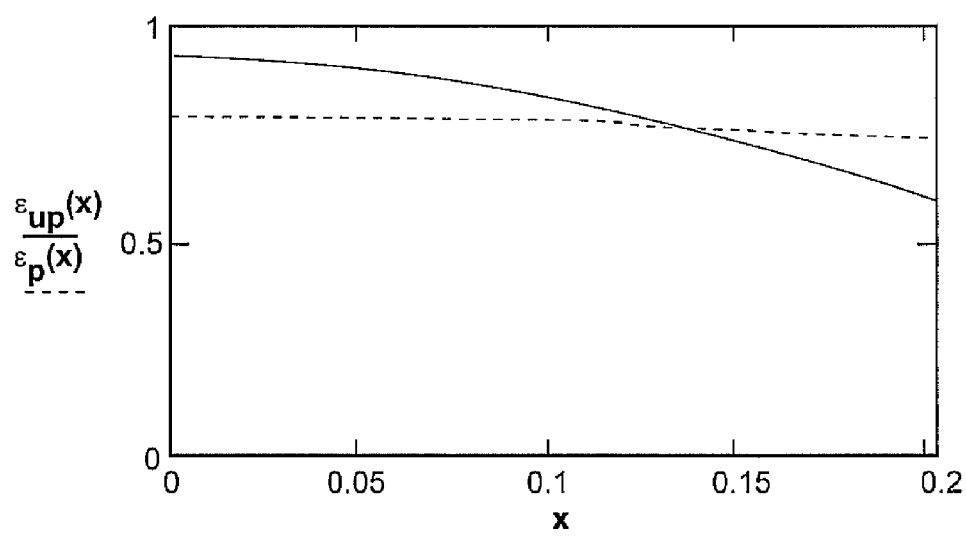
FIG. 29 is a graph showing strain versus position along the bellows.

One must also however at some point consider the interaction of the pressure stresses as well. For a design of this type, when the elastomeric layers have lower height, one can see that the shear stresses associated with the pressure, which are transferred over the interface to the hoops are lower than those of a uniform height bellows. In fact, this shear is simply inversely proportional to the height of the elastomeric layer. As such, the pressure stress is one half as large at one end of the bellows as it is at the other, due to this stiffness tailoring. For a particular chosen value of the pressure, the sum of these effects is shown in FIG. 29.

In summary for this example, while we observe very good improvement by tailoring the stiffness in the global strain profile, peculiarities of the construction resulted in localized stress concentrations, which happened to conspire to reduce the benefit from the initial deflection optimization. Unless otherwise ameliorated, when taken in consideration with pressure stresses, a net benefit was afforded to the bellows with a variation in stiffness, using the method described herein. Of course, this bellows also does not have higher order modes with associated modal frequencies which are integer multiples of the fundamental, which also represents an improvement when the driving function is only approximately sinusoidal, as might occur for a number of reasons mentioned above.

It should be clear that the general principle of these illustrative examples can be applied to a range of possible bellows types. For example, one could achieve the desired variation of properties in a bellows of the type described in U.S. Pat. No. 6,755,027, through variation in the material properties of the elastomeric sealant, by tapering the wall thickness, or changing the dimensions in the elements which make up the cylindrical spring. Other means may also exist.

Figure 30:
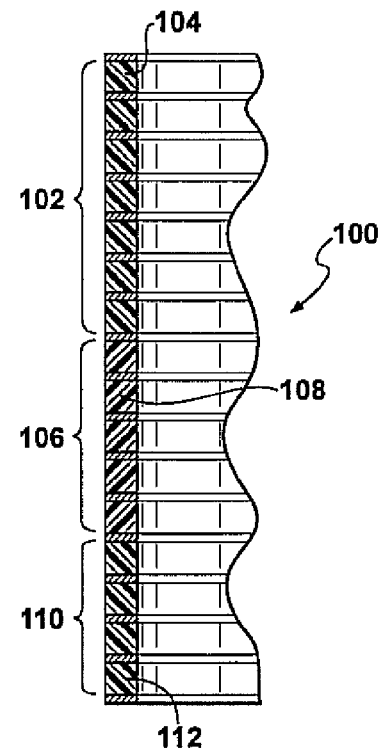
FIG. 30 is a cross-sectional view of a portion of a bellows showing another alternative configuration.

Another type of bellows in which similar property variation could be accomplished consists of a stack of alternating metallic and elastomeric layers. More generally, such a structure could be any two materials, such that one has high compliance, and the other has high stiffness: the former to permit axial compression and the latter to provide resistance to buckling from pressure differential from the inside to the outside of the bellows. In such a composite structure, consisting of alternating materials of high compliance and low compliance, the improvement described herein can be achieved via varying the ratio of thicknesses in the materials from one end of the bellows to the other, by use of a range of a range of compliant materials with different stiffness and density along the axis of the bellows, or again, by variation of the wall thickness. FIG. 30 shows a portion of a bellows 100 wherein different high compliance materials are used in different layers. For example, section 102 has layers 104 with a first compliance, section 106, has layers 108 with a second compliance, and section 110 has layers 112 with a third compliance. Of course combinations of the above may also be employed, and this list is not exhaustive.

Figure 31:
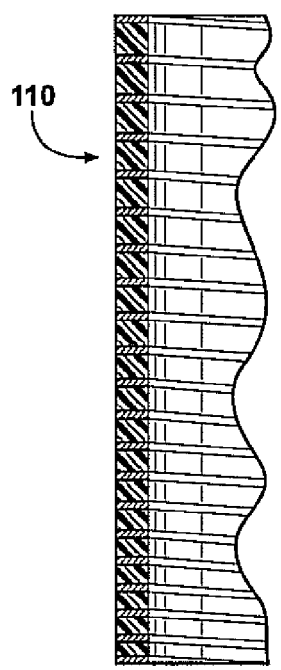
FIG. 31 is a cross-sectional view of a portion of a bellows according to yet a further embodiment of the present invention.

Similar improvements can be made if the structure consists, instead of independent layers of low compliance material and high compliance material, of a helical coil spring with an elastomeric material filling the spaces between the coils. A portion of a bellows 110 with such a design is shown in FIG. 31. This design accomplishes in function the same goal as described in the previous example, wherein the stiffness variation could be achieved via a variation in the pitch of the spring, so as to accomplish a change in stiffness, similar to the means described in the layered structure. The wall thickness could also be varied, or other combinations made. As a further alternative, a tubular bellows formed of only one material, without the low compliance layers or spiral, could be formed with varying stiffness or density.

It should be noted for the improved exemplary cases described above, and for other embodiments of the present invention, that a linear stiffness profile is not an essential element of the invention. Other mathematical formulations may be equally suitable which are polynomial, can be approximated by polynomials or have other reasonably continuous forms suitable for numerical integration, such as the 'step-wise' incremental thickness case discussed above. In general, the improved solutions require only monotonically decreasing stiffness and/or mass per unit length which decreases from the fixed end to the moving end, the exact nature of which will depend on the particular type of generalized bellows construction, and numerical evaluation using the approach outlined here. Additionally, a profile that is not easily formulated mathematically may be useful, even though it is difficult or impossible to analyze in the same way as the examples herein.

For any type of bellows, the method described herein may be used to reduce the stresses in the bellows, to increase the fatigue resistance, permit use of less material or less expensive material, or permit a larger piston displacement than the equivalent prior art, since the stress curves produced are linearly proportional to the end deflection.

A further advantage of such variable stiffness/density bellows, is that they do not have resonance frequencies which lie on integer multiples of the drive frequency, as is true for the prior art frequency optimized bellows. The resonance frequencies for the prior art conventional bellows lie on multiples of the operating frequency, and the bellows resonances could potentially be excited due to non-linear behavior in the linear motor, or other parts. The latter means that the designer of a thermoacoustic device may not need to be as concerned about excitation of higher order bellows resonance frequencies, associated with non-linearities in the linear motor or other aspects of the device by an improved bellows, as described.

One version of a bellows described above, and shown in FIGS. 20-23, is referred to as a hoop-stack. In the hoop-stack implementation, the wall is comprised of alternating layers of high compliance and low compliance material. The function of the high compliance material is to provide axial compliance to the structure, while the low compliance material restrains the high compliance material against the pressure loads. As a practical matter, the high compliance material might be an elastomer, such as rubber, and the high compliance material might be metal or other highly stiff material. In the embodiments described above, the hoop-stack bellows was configured so as to provide an axial stiffness and/or axial linear mass density that varies generally monotonically between the ends. Circumstances exist in which a generally uniform stiffness bellows is sufficient, and may be more cost effective. We turn now to a description of thermoacoustic device where such a bellows may be used, and the a detailed description and analysis of the bellows.

In designing a bellows for application in a thermoacoustic device there are four significant considerations:

1) As typical operation in a thermoacoustic device involves operation at frequencies generally above 10 Hz and typically at 60 Hz or more, a bellows used therein experiences a very large number of cycles in a short period of time, and will there for be prone to fatigue. It is known in the art, that fatigue resistance in elastomeric materials decreases with local strain energy density. Environmental conditions also have an effect, with important contributions to the degradation coming from the presence of oxygen, ozone, and ultraviolet light. In most thermoacoustic refrigerators/engines, the working fluid is an inert gas, (e.g. Helium.), and the devices operate within an enclosure, so that these important environmental contributions can be reduced. Some elastomeric materials, such as natural rubber, can, in the absence of environmental degradation, have a threshold value for fatigue crack growth. Design of a bellows such that the tearing energy for the configuration lies below this threshold value means that the part can have infinite cycle lifetime.

2) Elastomeric materials, in general, have internal dissipation mechanisms which consume energy in a thermoacoustic device. Further, these dissipation mechanisms are a function of operating frequency and temperature, and this dissipation is often characterized by a parameter, known in the art as a loss tangent. Strain energy will be stored in a hoop-stack bellows, due to two mechanisms: compression and extension of the bellows, and the oscillatory pressure difference across the bellows wall. In general, the deleterious energy dissipation is proportional to the product of the loss tangent, the strain energy, and the operating frequency.

3) In general, there is no need for the bellows body to provide stiffness to the thermoacoustic system; the essential requirements are that the bellows be able to compress and expand along its axis, and that it maintain a pressure difference. This means that the axial stiffness, while it can be a critical feature if too low, such that compressional waves travel along the bellows, is not otherwise an independent design goal. In other words, in this application, the bellows does not need to provide any mechanical design stiffness, as it often the case in a composite spring application.

4) Any bellows implementation with excessive surface area will also produce surface thermoviscous dissipation as a consequence of the interaction of the oscillating gas pressure and motion. A cylindrical structure thus has some advantages a corrugated structure.

The advantages and function of a hoop-stack bellows can be introduced by a summary description of the Cylindrical Spring with Integral Gas Seal (CSIGS) described in U.S. Pat. No. 6,755,027. The basic concept of the CSIGS is straightforward: seal the spaces in a mechanical spring so as to produce a structure which can couple mechanical work to the gas. A helical spring variant, with gaps filled with rubber, intended for automotive suspension applications is described briefly in *Natural Rubber Science and Technology*, A. D. Roberts, editor, Oxford University Press, p 925. (1988).

One of the facets of the CSIGS structure that is shared with a conventional thin walled metal corrugated bellows is an azimuthal symmetry. This aspect is motivated by a practical aspect of many moving-magnet electrodynamic motors which are used in thermoacoustic machines: in many of these motors, permanent magnets travel within a gap in ferromagnetic material (much like the iron core of a transformer) and are maintained in this otherwise unstable arrangement by straps. If additional twisting loads were applied to these motors about the axis of the bellows (as would be the case during the compression of a simple coil spring) this would add substantial unnecessary loads to the straps. This, for example, would be a concern for a conventional helical spring, as these tend to twist about their axis during axial compression and extension. The CSIGS may be viewed as a structure which has bending elements that provide both axial compliance and provide a sort of 'scaffold' for an elastomeric 'filler' in the gaps. The filler provides a pressure seal, which an unreinforced elastomer alone cannot provide without excessive deflection of the elastomer perpendicular to the bellows axis—i.e. "ballooning" outwards or inwards as a consequence of the acoustic pressure changes. If unrestricted, such motions could cause excessive loads on the elastomer, increase dissipation, and reduce the amplitude of the pressure oscillation, as a consequence of the concomitant increase in the effective bellows volume.

Neglecting for a moment the pressure loads, the CSIGS can be compared to a simple 'hoop-stack', but the hoop-stack bellows dispenses with the vertical struts (parts indicated as "80" in the CSIGS Figures). Considering the axial compression, a hoop stack can perform exactly the same function at half the maximum local stresses in the elastomer, and there is no stress due to deflection in the low compliance material. A doubling in stress results in an approximately four-fold increase in the strain energy density. The latter parameter is of interest in estimating fatigue limits in elastomers such as natural rubber. In general, in rubber, plots of crack growth rate per cycle vs. tearing energy provide the most consistent means of estimating lifetime of a part, and the latter parameter is comprised of the strain energy density in the material and numerical factors related to the geometry. In general, higher strain energy densities in a given geometry lead to increased crack growth rates.

In a thermoacoustic device, the dissipation in the elastomeric material can also be an issue. Because all highly compliant materials exhibit some degree of visoelasticty, and the bellows is compressed and expanded at the operating frequency, some of the work used to compress and expand the bellows is not recovered. Thus, both the stress and the power dissipation in the elastomer are important; the latter from a total efficiency stand point, as well as the potential impact of elastomer self-heating. The stress limit will govern the maximum achievable pressure ratio, which must be informed by the fatigue performance of the elastomer.

In the limit that the elastomer provides little axial stiffness to the full structure, one can also readily estimate the deflection curve for the beams of the CSIGS as that of an unstiffened beam, then impose this deflection on a hypothetical elastomer resulting, somewhat surprisingly, in 50 percent lower damping (power dissipation) loss for the hoop-stack, vs the CSIGS for a given axial compression. On the other hand, to resist the reversing pressure loads, it does not seem that a "hoop-stack" has any higher (or lower) requirements than the cylindrical spring. Given that elastomers can sustain larger strains with infinite lifetimes than any other material, this type of structure (hoop-stack), in which there are no deflection induced stresses in non-elastomeric parts, represents an improvement over a CSIGS, whenever additional stiffness from the structure is not in itself a design requirement.

Figure 32A:
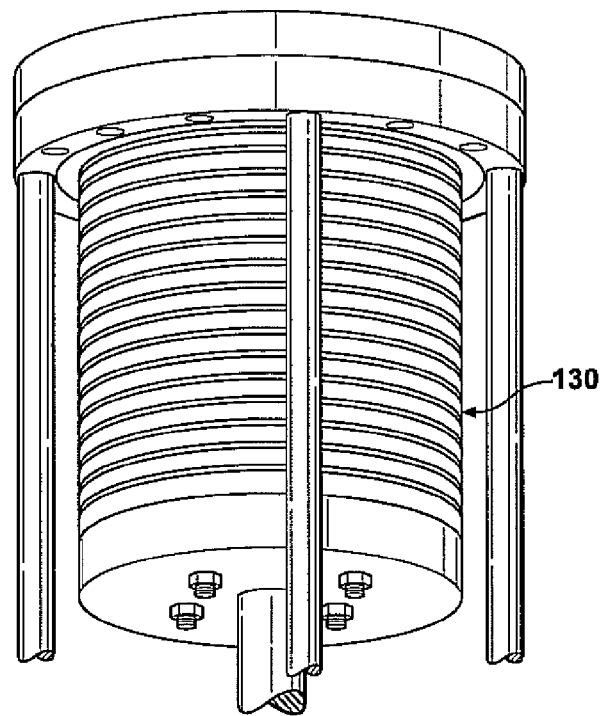
FIG. 32A is a perspective view of a bellows according to an alternative embodiment of the present invention wherein the axial stiffness or linear mass density does not necessarily vary monotonically between the ends.
Figure 32B:
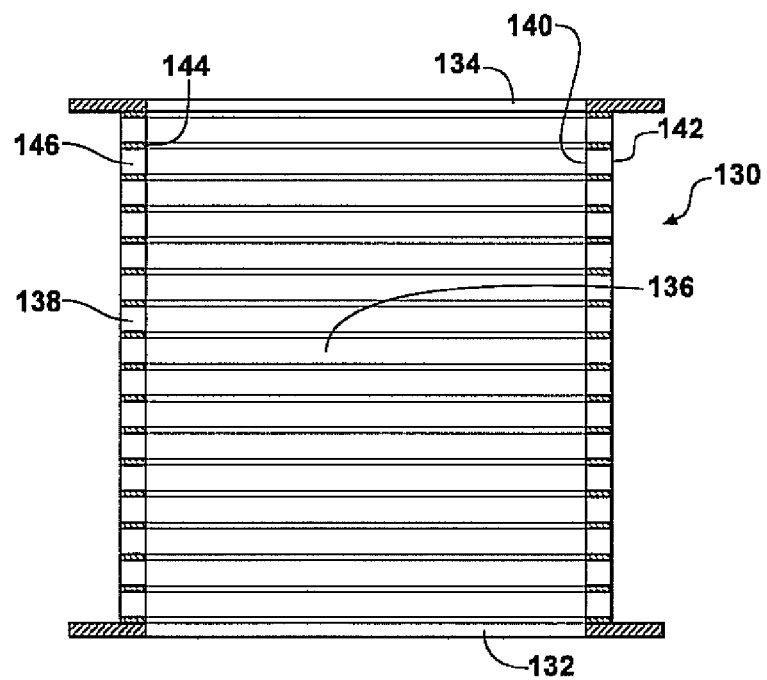
FIG. 32B is a cross-sectional view of the bellows of FIG. 32A showing the formation of alternating layers of high and low compliance material.

An exemplary embodiment of the hoop-stack bellows similar to the embodiment described hererinabove is shown generally at 130 in FIGS. 32A and 32B. However, the embodiment of FIGS. 32A and 32B may differ from the earlier embodiments in that the stiffness and/or linear mass density does not vary monotonically between the ends.

The bellows 130 has a bellows body with a first end 132, a second end 134, and a midportion 136 extending therebetween. The body of the bellows 130 may be said to have a generally ring-like cross sectional shape and a cross sectional dimension (radius or diameter) that is generally constant along its length. Other cross sectional shapes are possible, though round is typical. The bellows body may be said to be generally tubular.

The bellows body is defined by a wall 138 that may be said to generally enclose a volume. In use, the volume inside the generally tubular body may be filled with a working gas for a thermoacoustic device. The wall has an inner surface 140 and an outer surface 142 separated by the wall thickness. In the illustrated embodiment, the inner and outer surfaces are generally cylindrical and coaxial.

In the hoop-stack design, the body is formed by alternating layers of low compliance and high compliance materials. This is best illustrated in the cross sectional view of FIG. 32B wherein a low compliance layer is shown at 144 and a high compliance layer is shown at 146. By "alternating layers" it is meant that the high compliance layer does not form a spiral but instead each high compliance layer is generally planar and separated from the next high compliance layer by a generally planar layer of the low compliance material.

Referring to FIG. 33A, two low compliance layers 144 are shown sandwiching a high compliance layer 146. In the illustrated embodiment, each of the layers is a generally hoop shaped element formed out of one material. The low compliance layer 144 may be said to have an inner radius 148 and an outer radius 150. Likewise, the high compliance layer 146 may be said to have an inner radius 152 and an outer radius 154. The inner radius 152 of the high compliance layer and the inner radius 148 of the low compliance layer in the illustrated embodiment are in register and together define the inner surface of the wall. Likewise, the outer radius 154 of the high compliance layer and the outer radius 150 of the low compliance layer are in register and together define the outer surface of the wall. FIG. 33A illustrates a radial cross section of the low and high compliance layers. As shown, high compliance layer 146 has a thickness, t, defined between the inner radius 152 and the outer radius 154, and a height, h, defined as the longitudinal distance between the two low compliance layers 144.

In one example, the bellows 130 consists of alternating layers of steel and natural rubber. As discussed previously, the low compliance layers may instead be formed of aluminum, composites, thermo-formed plastics, thermo-set plastics and other materials known to those of skill in the art. The high compliance layer may be any of a variety of elastomers known to those of skill in the art.

For purposes of the present invention, a high compliance material is one which can repeatedly and reversibly sustain elastic strains of at least 10% without damage; elastomeric materials like natural or synthetic rubbers would constitute examples of such materials, as would thermoplastic elastomers. A low compliance material is one which has a Young's modulus at least 20 times greater than the high compliance material.

For some embodiments, it is preferred that the high compliance material is a strain crystallizing elastomer. When an elastomer is subjected to a non-isotropic strain, the material can become non-isotropic as well, in the sense that when there is a preferred elongation direction in the network, this will result in increased ordering in the polymeric chains in this direction. For some types of polymeric base structures this elongation can thus further permit formation of local crystallites. The crystallites form and remelt reversibly as strain is applied and removed. Upon formation these crystallites will tie together a number of neighboring network chains, thereby producing a cross-linking effect. The local modulus of the crystallite can be several orders of magnitude larger than that of the unstrained material. In dynamic applications, where fatigue is a consideration, use of material which can strain-crystallize is often a benefit, as fatigue is essentially a local failure process which occurs at the highly stressed regions of a crack tip. In a strain crystallizing elastomer, the locally high stresses can produce crystallization at the tip of the crack, and act as a retardant to crack propagation, because of the locally high modulus and the greater energy required to propagate a crack through such regions. Natural rubber (consisting chemically of isoprene) is one, well known such elastomer. Other examples include polychloroprene (Neoprene™), hydrogenated nitrile rubber; others polymeric base structures are known in the art, and materials exhibiting this characteristic are expected to be synthesized and invented in the future; a recent invention of such a material is described in U.S. Pat. No. 5,492,993 to Saam et. al.

We now turn to a description of the basic mechanical response of a hoop-stack bellows consisting of alternating layers of elastomeric material and metal. The goal is to describe the response of the elastomeric layers to the compression, and the pressure differential: to estimate the stress, effective modulus, and power dissipation, as a function of the compression, pressure, and dimensions of the elastomeric layer. For simplicity, we will assume small strains, as normally done for solids other than elastomers; a more refined analysis can be carried out by finite element analysis.

In a thermoacoustic device, the power density scales as the square of the pressure amplitude; a typical modern thermoacoustic machine might have an acoustic amplitude of 8% of the mean pressure, which might be 2 MPa. Higher values of both are generally desirable, but these values will be used as an illustrative example. Using helium gas, roughly approximating the total internal volume of the bellows as equivalent to the total gas volume of the device, and assuming the bulk of the gas is adiabatic, this implies a required fractional volume change in the bellows of:

$$PV^\gamma = const; \therefore \frac{dP}{P}\left(\frac{1}{\gamma}\right) = \frac{-dV}{V} \quad (A.13)$$

$$\frac{dV}{V} = .08\left(\frac{3}{5}\right) \approx 5\%$$

Because the metal hoops are, relatively, incompressible the actual compression in the rubber section will have to be commensurately increased to maintain the desired fractional volume change. For example, if the ratio of metal to rubber is 1:3, this would require an axial strain in the rubber of 6.7%. The thickness of the low compliance layers will in general depend on the differential pressure, as the pressure loads are ultimately delivered to these rings; it is assumed that this design, in terms of stress and stability, can be carried out by one ordinarily skilled in the art.

As the bellows compresses, the pressure within the bellows increases to an extent that depends on the mean pressure described above. As a practical matter, when operating in a closed container (e.g. applications of the sort described by in U.S. Pat. Nos. 6,792,764 to Poese et al. and 6,725,670 to Smith et al.) compression of the interior volume of the bellows also produces an expansion of the back space, which can increase the pressure differential across the bellows. Because this depends a bit on the details of the configuration, we will simply assume a mean pressure of 2 MPa, and approximately equal front and rear volumes. This results in a target maximum pressure differential of 46 psi.

When an elastomer is sandwiched between rigid materials and the assembly is subjected to tension or compression perpendicular to the lamina, one effect of the constraint is to produce an effective modulus which is higher than that for laterally unconstrained rubber. The effective modulus in concert with the axial strain in the bellows structure permits estimation of the strain energy which, as noted earlier, is important in the efficiency of the overall design. Empirical relations for the effective modulus are often given in handbooks in terms of the ratios of 'loaded to unloaded' surfaces, sometimes containing considerable approximation. Gent and Lindley (A. N. Gent and P. B. Lindley, "The compression of bonded rubber blocks", Proc. Instn Mech Engrs, Vol 173, No 3, p 111-122, (1959)) compared experimental results with a theoretical approach to determination of the effective modulus and found good agreement.

Here we will not retrace Gent and Lindley's more general derivation, but pursue a more straightforward approach which is appropriate for the case of loading to be encountered in a hoop-stack bellows as conceived here, i.e. one having an 'infinitely long' rectangular cross-section. Following one element of the approach by Gent and Lindley, we take the stiffness to be conceptually comprised of the sequence of two processes: that which would be associated with an unconstrained deflection or a pure shear or compression of the rubber between frictionless blocks and that which would be associated with the additional shear deformation imposed by the constraint. FIGS. 33A and 33B illustrate an elastomeric material bonded between layers of stiff material, to be subjected to a uniaxial force perpendicular to the lamina. If we arrange our coordinate system as shown in the Figures, we can approach the first component of the stiffness beginning with the ordinary constitute relations, and the assumption that the normal stresses on the elastomer in the x-directions are zero, and the strain in the z-direction is zero; a pure shear condition.

$$\varepsilon_{xx} = \frac{1}{E}(\sigma_{xx} - v(\sigma_{yy} + \sigma_{zz})) \Rightarrow \frac{-v}{E}(\sigma_{yy} + \sigma_{zz}) \quad (A.13)$$

$$\varepsilon_{yy} = \frac{1}{E}(\sigma_{yy} - v(\sigma_{xx} + \sigma_{zz})) \Rightarrow \frac{1}{E}(\sigma_{yy} + v\sigma_{zz})$$

$$\varepsilon_{zz} = 0 = \frac{1}{E}(\sigma_{zz} - v(\sigma_{yy} + \sigma_{xx})) \Rightarrow \sigma_{zz} = v\sigma_{yy}$$

In the limit that the elastomer is incompressible, Poisson's ratio, v, is 0.5 and the equations above may be combined to obtain $$\sigma_{yy} = \frac{4}{3}E\varepsilon_{yy}, \quad (A.14)$$

so that the coefficient relating the vertical stress and strain can be interpreted as an effective modulus.

Evaluation of the contribution to the effective modulus associated with the constraint can be obtained from the strain energy associated with the deformation, again assuming the constant volume deformation implied by v=0.5. To find this strain energy, we assume zero normal strain in the x-direction at the bonding interfaces and make the assumption that the unstressed surfaces will take on a parabolic shape to maintain the constant volume conditions.

FIG. 33B illustrates the elastomer block with original height h and thickness t, compressed to a small displacement $\epsilon_{yy}h$. The volume of material displaced to produce the parabolic profile is then $(\epsilon_{yy}h)t$ per unit length in the z direction. Given the two axes of symmetry in the problem, we can consider $\frac{1}{4}^{th}$ of the block with the task to find $x_{max}$ such that a volume match occurs. FIG. 34 provides an exaggerated view of this situation.

For purposes of finding $x_{max}$ we shall neglect the effect of small changes in the effective value of h resulting from the deflection, and construct a parabola that passes through the origin and the point $(x_{max}, h/2)$ to match the interface bonding constraint at the outer boundary of the block. It is possible to include the perturbing effect of the deflection on the height, but one finds that in the process of linearization of this contribution to the modulus, the effect is the same as making this assumption at the outset. The form of the parabolic outer surface then becomes $$y = \frac{h}{2}\left(\frac{1}{\sqrt{x_{max}}}\right)\sqrt{x} \qquad (A.15)$$

And $x_{max}$ is extracted from the "volume matching" condition $$\left(\frac{1}{4}\right)\varepsilon_{yy}ht = \int_0^{x_{max}} \frac{h}{2}\left(\frac{1}{\sqrt{x_{max}}}\right)\sqrt{x}\, dx \qquad (A.16)$$

$$\Rightarrow x_{max} = 3/4\varepsilon_{yy}t$$

Having determined the depth of the parabola, it is convenient to shift the origin of the coordinate system to the center of the block; the displacement field in the x direction can then described by $$u(x, y) = x\left(\frac{2}{t}\right)\left(\frac{3\varepsilon_{yy}t}{4}\right)\left(1 - \frac{4y^2}{h^2}\right) \qquad (A.17)$$

There are a few ways we can check this formulation—We expect the displacement of material to increase linearly from the center of the block, towards the outside. Second, we know the displacement we expect at x=t/2 and y=0 should be ¾$\varepsilon_{yy}$t, and we expect the displacement to be zero at x=t/2, y=h/2. The engineering shear strain in the field is then obtained from $$\frac{du}{dy} \equiv \gamma_{xy} = x\left(\frac{2}{t}\right)\left(\frac{3\varepsilon_{yy}t}{4}\right)\left(\frac{-8y}{h^2}\right) = \frac{-12\varepsilon}{h^2}xy. \qquad (A.18)$$

The strain energy is then computed using the shear modulus G over the ¼ block, leaving out some tedious algebra, in the usual way:

$$U_{strain} = \int_V \frac{1}{2}G\left(\frac{du}{dy}\right)^2 dV = \frac{\varepsilon^2 t^3}{4h}\left(\frac{1}{2}G\right) \qquad (A.19)$$

where we have dropped the subscripts indicating the direction of the imposed strain. Recall that the strain energy is for a unit length of the elastomer. The strain energy for the full block is then 4 times this value. Then, an equivalent stiffness can be extracted:

$$U_{strain} = \frac{1}{2}k_{eq}(\varepsilon h)^2 = \frac{\varepsilon^2 t^3}{h}\left(\frac{1}{2}G\right) \qquad (A.20)$$

$$k_{eq} = \left(\frac{t^3}{h^3}\right)G$$

To convert this to an equivalent modulus, from a stiffness per unit length, we say $$k_{eq} = \left(\frac{t^3}{h^3}\right)G = \frac{E_{eq}A}{L} = \frac{E_{eq}(t/2)}{(h/2)} \qquad (A.21)$$

$$E_{eq} = \frac{t^2}{h^2}G$$

This equation represents the second part of the stiffness contribution, as described at the outset. Combining this with the pure shear contribution, by rewriting G=⅓E, in the second result, consistent with the constant volume assumption, we obtain either of the equivalent:

$$E_{eq} = E\left(\frac{4}{3} + \frac{1}{3}\left(\frac{t}{h}\right)^2\right) \qquad (A.22)$$

$$E_{eq} = G\left[4 + \left(\frac{t}{h}\right)^2\right]$$

This is consistent with the result obtained by Gent and Lindley, by an alternate analysis path.

A second aspect of the constraint is the local shear stress concentration at the interface, which reaches a maximum value at the outer surface, at the bonding interface. Taking advantage of the equation we derived for the shear strain field we can observe that $$\left.\frac{du}{dy}\right|_{max} = -3\frac{\varepsilon_{yy}t}{h} = \gamma_{xy\_compression}, \qquad (A.23)$$

implying that for a square aspect ratio this stress concentration is substantially larger than that associated with the compressive direct strain. In the limit that the strains are small (and they aren't really, by design) one might expect in some sense, symmetric behavior in tension as well.

The total shear strain at this same location, will be a combination of the two normal strains (compression in y and extension in x), from the first component of the assumed deflection and the shear contribution described above. These could be combined in a "Mohr's Circle" type of approach to identify the value and direction of maximum shear strain. To the extent that the contribution from the pressure load will add substantially to the shear strain at the interface, we will not carry that out at this point.

Using the equivalent stiffness, and material modulus, we can obtain a total energy storage in the rubber block, as a function of deflection, regardless of the fact that strain energy density is not uniform in the block. The dissipation can be calculated as $$U_{strain\_deflection} = \frac{1}{2}G\varepsilon^2\left(4(t \cdot h) + \frac{t^3}{h}\right) \qquad (A.24)$$

$$\Pi_{dis} = \omega(\tan\delta)U_{strain}$$

where $\omega$ is the frequency, in radians/sec at which the elastomer is cycled, and tan $\delta$ is the loss tangent of the elastomer.

As the bellows compresses, a pressure differential across the bellows must be resisted by the elastomer; as such, we must evaluate the load from this process as well as the strain energy storage, since relaxation here also represents energy that must be supplied by the driver or motor that is not useable for thermoacoustic heat pumping. FIG. 35 illustrates deflection of the elastomeric layer due to the pressure differential.

The analysis path is in some sense a "replica with simplification" of what occurs, for example in laminar internal flow in liquids, and produces no real surprises, other than a useful result, so it will just be outlined here.

A force balance per unit length in the z direction produces:

$$\left[\tau - \left(\tau + \frac{d\tau}{dy}dy\right)\right]dx + \left[P - \left(P + \frac{dP}{dx}dx\right)\right]dy = 0 \quad (A.25)$$

$$\frac{d\tau}{dy} = -\frac{dP}{dx}$$

Now, if we replace the shear stress in the above equation, again using the displacement in the x direction, $u(y)$, $$\tau = G\gamma_{xy} = G\frac{du}{dy}, \text{ thus} \quad (A.26)$$

$$\frac{d^2u}{dy^2} = -\left(\frac{1}{G}\right)\frac{dP}{dx}$$

Integrating displacement, and imposing zero displacement at the metal interfaces, i.e.

$$u\left(\frac{h}{2}\right) = u\left(\frac{-h}{2}\right) = 0,$$

we obtain the anticipated parabolic shape, and shear strain:

$$u(y) = \left(\frac{1}{2G}\right)\frac{dP}{dx}\left(\left(\frac{h}{2}\right)^2 - y^2\right) \quad (A.27)$$

$$\gamma_{xy\_pressure}(y) = \frac{du}{dy} = -\left(\frac{1}{G}\right)\frac{dP}{dx}y$$

Using the same expression for shear strain energy density we used in the last section, we find that the strain energy per unit length in the elastomer is:

$$U_{strain\_pressure} = \left(\frac{\Delta P^2}{2G}\right)\frac{h^3}{12t} \quad (A.28)$$

Figure 36:
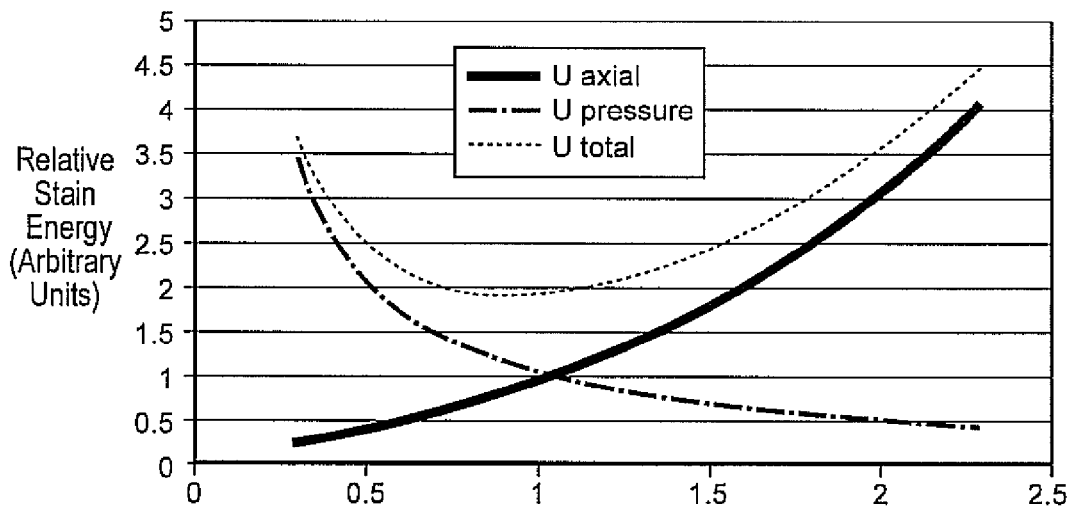
FIG. 36 is a graph showing strain energy versus elastomer aspect ratio.
Figure 37:
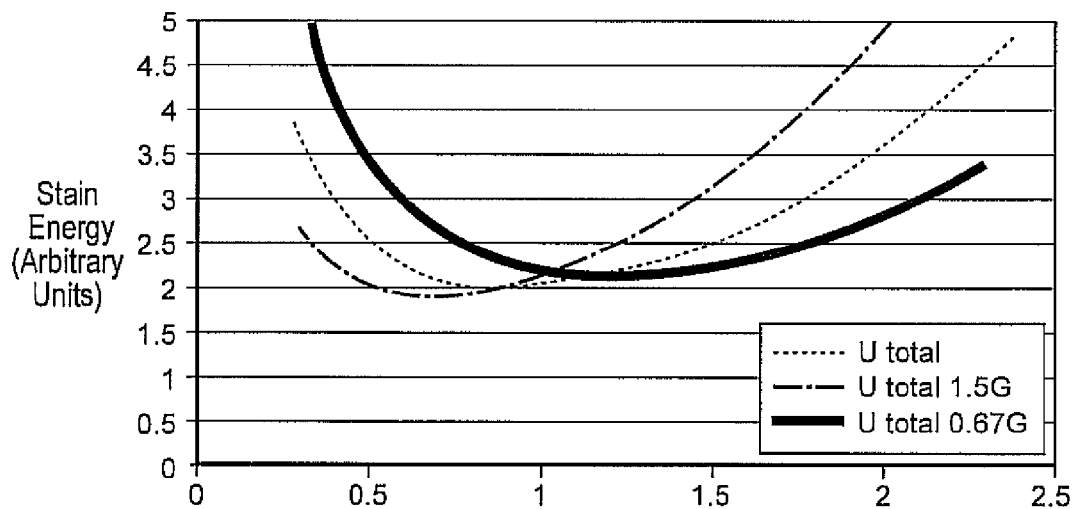
FIG. 37 is another graph showing strain energy versus elastomer aspect ratio.

Based only on the local mechanics, minimization of the flexure energy storage, and thus the dissipation would lead to a desire to minimize the quantity:

$$U_{strain\_total} = \frac{1}{2}G\varepsilon^2\left(4(t\cdot h) + \frac{t^3}{h}\right) + \left(\frac{\Delta P^2}{2G}\right)\frac{h^3}{12t}. \quad (A.29)$$

where G is a predetermined shear modulus of the high compliance material, $\epsilon$ is a predetermined axial strain of the high compliance material along the longitudinal axis of the bellows, and $\Delta P$ is a "predetermined peak dynamic pressure difference between a pressure in the volume enclosed by the bellows and a pressure exterior to the bellows". By way of definition, this is the maximum pressure difference across the bellows wall. For example, if the pressure in the volume enclosed by the bellows oscillates between 1.2 atmospheres and 0.8 atmospheres, and the pressure outside the bellows is 1 atmosphere, $\Delta P$ is 0.2 atmospheres. In another example, where the bellows is enclosed within an outer housing, which is also generally a closed volume, the pressure in the volume outside the bellows will also oscillate, generally out of phase with the pressure oscillations inside the bellows. Using the same pressure oscillation between 0.8 and 1.2 atmospheres inside the bellows, the pressure oscillations in the volume outside the bellows might be between 1.1 and 0.9 atmospheres. That is, at approximately the same time as the pressure inside the bellows peaks at 1.2 atmospheres, the pressure outside the bellows hits its minimum of 0.9 atmospheres. In this example, $\Delta P$ is 0.3 atmospheres. Referring again to the above equation, we see competing parameters, especially in the last two terms. A high modulus increases power consumption for compression, and does the opposite for pressure. Similar behavior occurs with the elastomer layer height h, and the bellows wall thickness t. In FIGS. 36 and 37, a graphic representation for the design values mentioned at the outset is presented, as a function of the elastomer aspect ratio t/h, with h at unity, and G=85 psi, a reasonable value for natural rubber. Values of G=1.5 (85 psi) and G=0.67 (85 psi) are also plotted for comparison in FIG. 37.

In some embodiments of the present invention directed to generally uniform stiffness bellows, the dimensions (t and h) of the layers of high compliance material are chosen so as to generally minimize the above equation for total strain energy (A.29). Because the equation reflects some earlier assumptions and may not provide perfect results, and because the dimensions may partially be dictated by other considerations, it is preferred that the dimensions and ratio of t to h of the layers of high compliance material be chosen such that the optimum value is within 20% of that value which minimizes the total strain energy as given by the equation above.

As noted above, axial compression (and extension) produces a maximum shear stress at the external corners of the elastomer, while pressure load produces a maximum (constant) shear stress along the two bonding interfaces, by this analysis. For the worst case positions (exterior corners in compression, interior corners in extension) using the rough design values at the beginning of the section and, for arguments sake, a reasonable number for the shear modulus of natural rubber (85 psi), and a square aspect ratio in the elastomer we find a shear strain of $$\gamma_{xy\_max} = \left(\frac{\Delta P}{G}\right)\frac{h}{2t} + 3\frac{\varepsilon t}{h} \quad (A.30)$$

where G is a predetermined shear modulus of the high compliance material, $\epsilon$ is a predetermined axial strain of the high compliance material along the longitudinal axis of the bellows, and $\Delta P$ is a predetermined peak dynamic pressure difference between a pressure in the volume enclosed by the bellows and a pressure exterior to the bellows.

We see that these large local strains are of the same order in this rough calculation, and we can see, that these strains are sufficiently large that the usual assumptions permitted in other materials, of small strains, are not really maintained here. The contribution from pure shear has been neglected, relative to the other terms. We see again in this expression competing design constraints, in terms of the peak local strain, which one might presume will govern the reliability of the part.

In some embodiments of the present invention, the dimensions and ratio of t and h of the layers of high compliance material are chosen so as to generally minimize the above equation for peak shear strain. Again, it is preferred that the dimensions of the layers of high compliance material be chosen such that peak strain, given by the formula above, is within 20% of the minimum for the formula.

We now turn to a general discussion of elastomers. This discussion is broadly divided into two parts. The first provides some generic background on the properties of elastomers. In the second part, we discuss the approach to estimating fatigue life for a practical part having dimensions appropriate for a thermoacoustic device.

Elastomers as a class share a number of properties that are useful to understand for design of the hoop-stack. The pragmatic needs perceived for a thermoacoustic refrigerator/engine or acoustic compressor include:

Operation over a modest, but non-zero range about room-temperature, in pressurized helium gas environment, as would be the case in a thermoacoustic refrigerator.

The need for low inherent dissipation, since this robs power from a thermoacoustic machine.

To the extent possible, linear, predictable, and stable properties, to permit repeatable experiments and comparison to known results.

High resistance to fatigue—infinite lifetime

Figure 38:
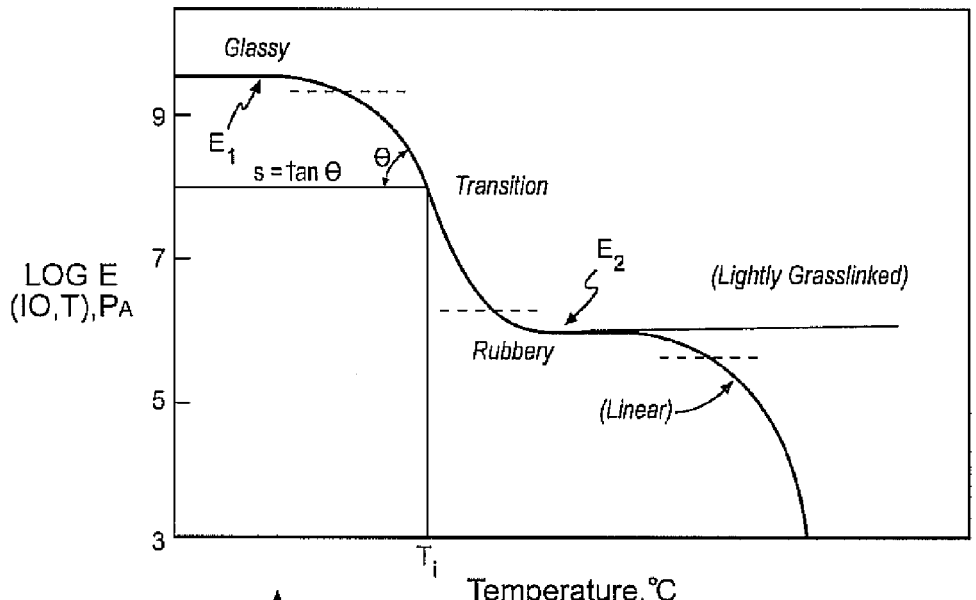
FIG. 38 is a graph showing typical modulus characteristics of an elastomeric material as a function of temperature.

The modulus characteristic for a generic elastomeric material is exhibited in the plot of FIG. 38, from J. J. Aldonis and William J. MacKnight, *Introduction to Polymer Viscoelasticity*, $2^{nd}$ Ed, Wiley and Sons, (1983). Several features are noteworthy in this plot. First is the large change in modulus that occurs, spanning the transition from the 'glassy' region to the "rubbery" region noted in the figure; it is typical for the change in modulus over this transition to cover several orders of magnitude. In the glassy region the elastomer has the characteristics exhibited by virtually all other solids: failure or permanent plastic deformation at strains of <2%. In the 'rubbery' plateau region of temperature in the figure, the elastomer exhibits the characteristics we usually associate with rubber bands—the capability to withstand very large extensions and to exhibit resilient behavior. In this plot, the temperature, $T_t$, marks the location of the cross-over, the so-called glass transition temperature. Clearly, a glass transition temperature which lies far below the range of temperatures over which the bellows will function is desirable, so that large excursions are possible and the material properties do not vary much during operation.

Figure 39:
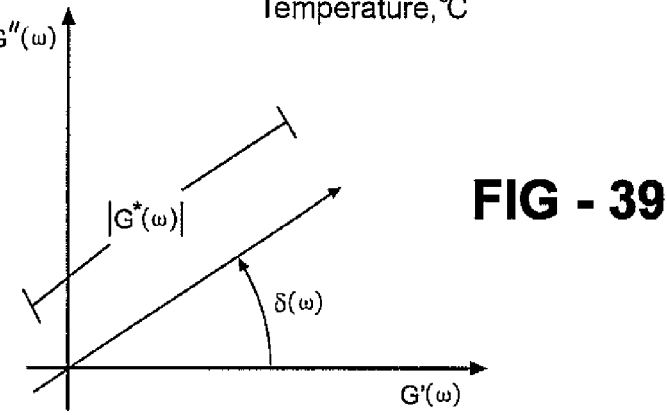
FIG. 39 is a graph illustrating the relationship between the magnitude of the modulus, the elastic modulus, and the loss modulus.

Elastomers are inherently viscoelastic. In fact, the generic curve given in FIG. 38 must also, in general, be associated with a particular frequency, or test-time interval, in order to define a "modulus". As alluded to above, the most common way used to describe the viscoelastic properties is via a complex modulus, or a "loss modulus" and/or the loss tangent, with the relationships shown in FIG. 39. This Figure shows the relationship between the magnitude of the modulus, given as $|G^*(\omega)|$ in the figure and the elastic modulus (single prime) and the loss modulus (double prime). The loss tangent is defined as the ratio $G''(\omega)/G'(\omega)=\tan(\delta(w))$.

Figure 40:
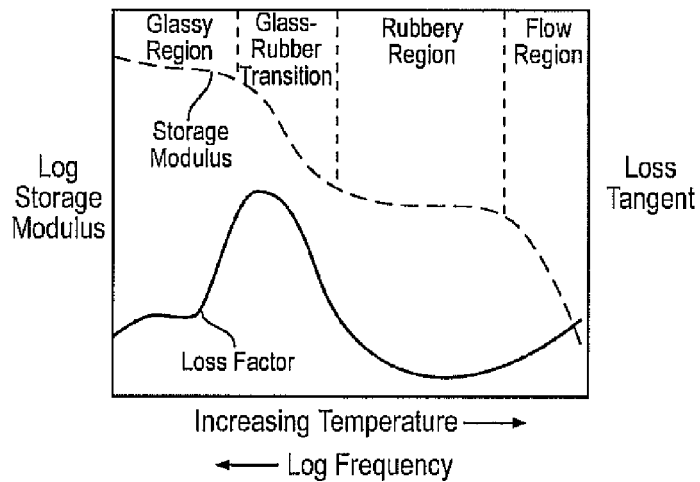
FIG. 40 is a graph providing a generic representation of the behavior of the loss tangent and storage modulus in an elastomer as a function of frequency and temperature.

As is true with "thermoviscous relaxation" in acoustic resonators, to the extent that the losses are not very large, it does not matter if dissipation is really caused by something one would identify directly with viscosity per se, or by thermal relaxation in the elastomer. The generic behavior of the loss tangent as it varies with storage modulus is provided in the schematic plot of FIG. 40, from Rodger N. Capps, *Elastomeric materials For Acoustical Applications*, Naval Research Laboratory, (1989), p 13. To the extent that we see in this generic plot, a rapid rise in the loss tangent as we approach the glass transition temperature, selection of an elastomer with a low glass transition temperature is desirable.

The following abstracted explanation of modulus behavior is summarized primarily from the book by Treloar (L. R. G. Treloar, *The Physics of Rubber Elasticity* $3^{rd}$ Ed, Oxford University Press, (1975)) as well as Aklonis and MacKnight (*Introduction to Polymer Viscoelasticity*, $2^{nd}$ Ed, Wiley and Sons, (1983)). Elastomeric materials consist of collections of long polymeric strands. These strands are not in general planar and linear, but are substantially disorganized, with a mean end-to-end length substantially shorter than of the maximum out-stretched length of the bonds; this occurs because, while the bond angle between adjacent atoms is fixed, there is freedom to rotate about the bond on a cone which preserves the bond angle. Practically speaking, "ends" as discussed here generally would correspond to points in the strand which are immobilized due to entanglement with other strands, or cross-links introduced in the vulcanization process.

For a single isolated strand with one end fixed and a given large polymer chain length, it can be shown statistically, if one permits arbitrary rotations about the bonds, the most likely natural position that the other end will occupy in space is in fact the starting point of the strand; (in some sense, this is the random walk problem) but in general this is not the most likely end-to-end length for the strand. For an isolated strand, it turns out that the probability density function is such that the most likely end to end distance is $$L_{segment} \approx \left( n l_b^2 \left( \frac{1+\cos\theta}{1+\cos\theta} \right) \right)^{1/2}. \tag{A.31}$$

Where n is the number of links in our polymer chain, $l_b$, is the length of a monomer 'link' and, and $\theta$ the bond angle about which the individual monomer units can reorient. It is this aspect that permits an elastomer to stretch—elongation is permitted because the initial arrangement of the bonds is substantially shorter that of the outstretched bonds, and if freedom exists to rotate along the bonds, the elastomer can be stretched without breaking bonds.

Of, course, no such jumbled strand is in reality isolated, but co-exists roughly conformally with neighboring jumbled strands that may constrain the motion as well. With this conceptual framework, it is not hard to imagine that the ability to rotate on a bond angle could be impeded by a) lack of sufficient time (stretch at too high a rate, or a high frequency), b) too low a temperature (not enough energy available in the system for rotation to be enabled and/or reduced space due to thermal contraction) or c) lack of available physical space. Development of quantitative theory, and numerical means to predict this time-temperature relationship was one of the great successes in the study of elastomeric materials, and is done via the Williams-Lendel-Ferry equation. In a subsequent section, in which some loss measurements on a prototype were performed at a range of temperatures and frequencies, the equation and application will be demonstrated. In short, the characteristics at one frequency and temperature can readily be related to those at another in this way, and thus, the loss tangent can be a strong function of temperature depending on where one sits on the characteristic curve for the elastomer.

These sort of considerations also lead to the concept of the "free-volume" within an elastomer, essentially the attempt at some kind of quantification of the space available to enable rotation about bond angles (at a given rate). This concept is reinforced, for example, by observing the modulus characteristics after applying a large hydrostatic pressure. Large hydrostatic compression shifts the glass transition temperature to a higher value, because it tends to reduce the free volume needed for mobility. In natural rubber there is a reduction in the glass transition temperature of 0.024 C/atm. This impact is quite small when one considers that typical thermoacoustic machines operate at 20-30 atm. Conversely, via the addition of "diluents"—additions during the formulation of the rubber—one can increase the free-volume and increase the freedom for bond rearrangement, a tendency which would tend to shift the modulus curve toward lower temperatures, and reduce the glass transition temperature.

In the process of stretching a single strand, one in effect reduces the number of states available from what was available in the un-stretched jumble; in the limit of a fully out-stretched strand, in some sense, only one configurational state is available. Since the entropy of the system depends on the log of the number of available states, performing a stretching operation requires a reduction in entropy in the elastomeric strand. If this is accomplished at constant temperature, and one roughly approximates the energy in the system as proportional to the temperature, it means thermodynamically that a certain amount of work must be done on the system. This effect produces some of what one observes in terms of temperature change in rubber, with stretching. Natural rubber (and some others) in addition to this effect, however, also strain crystallize at large extensions. That is, when rubber is stretched, the straightening of the bonds permits the strand to align with neighboring strands to form over some length an ordered network; this process occurs as something of a continuum phase change, and the degree of strain crystallization, as a volume fraction of the material, increases with the extent of the stretching. As we know from our experience with the water-ice transition, this transition from a higher entropy state to a lower entropy state requires the removal of heat. Again, on 'melting' of the rubber crystallites, as the tension is released, heat is absorbed by the rubber, just as it is with the ice-water transition; consequently rubber permitted to become isothermal with its environment after stretching, will cool when the tension is released.

While certainly interesting, from the point of view of design this latter aspect is beneficial in increasing the fatigue lifetime of the material. When a crack occurs, the crack tip represents a locally high state of strain, and local crystallization can occur at the crack tip; propagation of the crack, then also requires additional work to overcome the inter-strand energy which forms the crystal. In this way, the structure of the monomer which makes up the elastomeric material can impact fatigue life.

Figure 41:
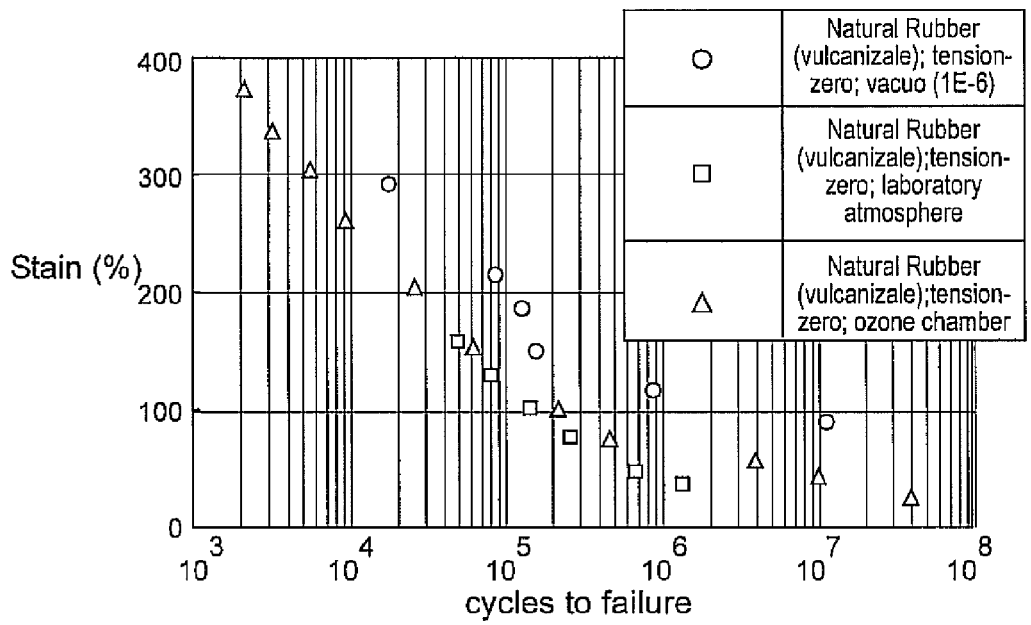
FIG. 41 is a graph illustrating the relationship between strain amplitude and the number-of-cycles to failure for natural rubber.
Figure 42:
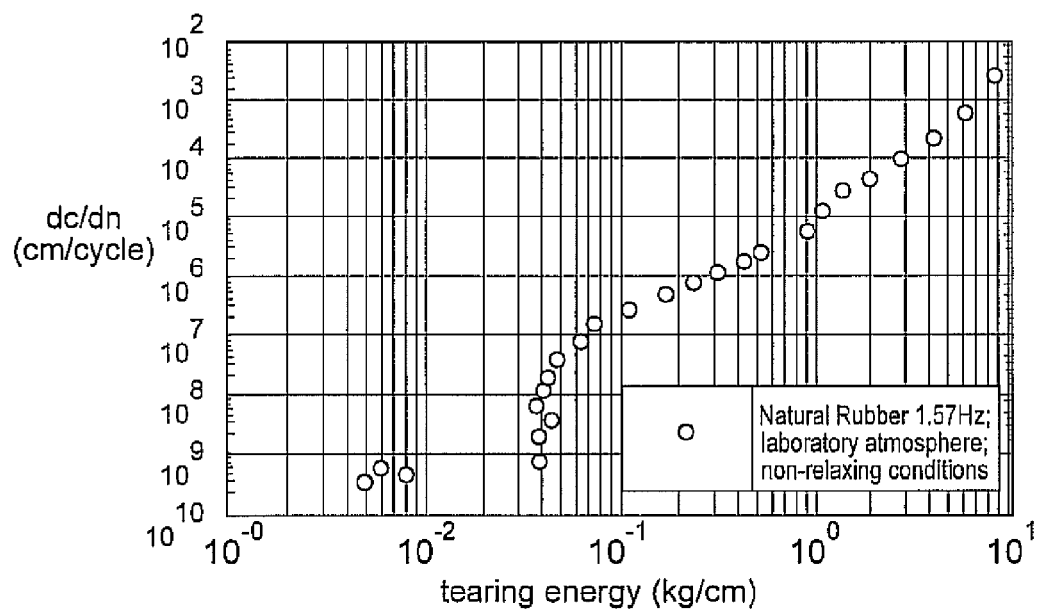
FIG. 42 is a graph illustrating fatigue crack propagation rate versus tearing energy for natural latex gum rubber vulcanizate.

Much like the more familiar situation in the study of metal fatigue, the approach for study of fatigue in elastomers falls into two basic categories: Stress vs. number-of-cycles investigations, and approaches based upon fracture mechanics. In rubber, the latter approach yields plots of crack growth per cycle vs. strain energy per unit area, in contrast with the crack growth vs. stress intensity for the case of metal failure. Examples of this type of data are given in FIGS. 41 and 42 from *Fatigue and Tribological Properties of Plastics and Elastomers*, Publisher: Plastics Design Library, a Division of William Andrew Inc. Norwich N.Y., (Second Printing: 1997), p 205-207.

In contrast with the case in metals, it does not appear to be straightforward to use strain-life curves performed in one geometry, and, with suitable modification for an equivalent strain, use these values to predict the endurance limit in a part with a complex stress state.

Figure 43:
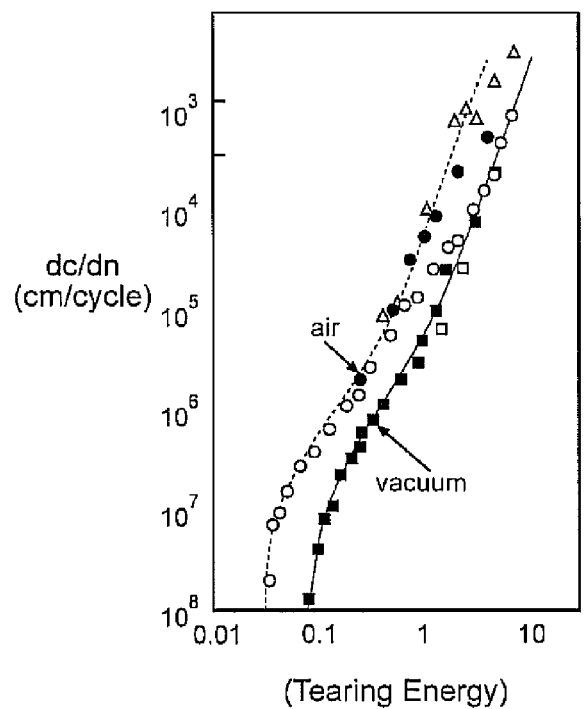
FIG. 43 illustrating the relationship between cycles and tearing energy.

For natural rubber, another effect which impacts fatigue is due to chemical interactions with the atmosphere: a finite non-zero crack growth rate per cycle in the presence of ozone (independent of how low the applied strain is) occurs, and enhancement of crack growth rates also occurs in the presence of oxygen. Some of these features can be observed in FIGS. 42 and 43, which plots cycles versus tearing energy. Fortunately, the latter two considerations should not be important in use in a thermoacoustic machine.

The fracture mechanics approach rests on the following idea: We begin with some crack or pre-existing flaw in a part and on application of a fixed strain to the part that is sufficiently large, crack growth will occur. When a crack starts to grow, it does so at the expense of stored strain energy in the part, as the presumption is made that no work is done by the surroundings on the part during crack growth. A further assumption is that the lost strain energy, due to the growth of the crack, is proportional to the amount of new surface area generated in the crack regardless of the exact mechanism of energy consumption at the crack tip. The convention for elastomers, per Gent, is to consider the "the area of one fracture surface of the crack." These are essentially the same as central assumptions made by Griffith, known by some as the "father of fracture mechanics" who first applied this approach to ceramics and glasses; the approach has been applied in various forms to virtually all materials, though in materials like metal and rubber, the energy required to produce new surface area is substantially larger than the thermodynamic surface free energy, and success of this approach relies on the fact the energy required to grow a crack is still proportional to the surface area fractured.

In service in the hoop-stack, the elastomeric rings experience cycles of compression and extension, as well as shear stresses associated with the pressure across the bellows, and these pressure stresses are on the same scale in magnitude and essentially in-phase with the displacement stresses. The initial approach in construction of a prototype was to use a fairly simple geometry in order to permit some hand calculations, and attempt from this initial estimate to operate the bellows in a regime where no crack growth is expected to occur (i.e., such that the tearing energy is less than the threshold for mechanical crack growth). A central question then, is to determine what level of compression and extension the elastomer can reversibly sustain for near-infinite lifetime. The discussion which follows will explore this issue.

A number of loading geometries exist that permit calculation of the tearing energy T in terms of the strain energy density in the part and either crack dimensions or, in some geometries, the dimensions of the part. These quantities are in either case, in principle, measurable quantities. The tearing energy is the strain energy consumed in production of fracture surface area and thus is typically expressed in units of Joules/$m^2$. As an aside, in the literature a number of equivalent terms for T are used. Per Stevenson (Unpublished review paper provided by W. V. Mars, authored by A. Stevenson: "Fatigue and Fracture of Rubber in Engineering Applications, Paper for Educational Symposium, $145^{th}$ Technical Meeting, ACS Rubber Division, Chicago 1994.): " . . . strain energy release rate (G), J-Integral (J), Fracture energy (t), and Tearing Energy (T) are all formally equivalent and it is simply a matter of terminology which is chosen." It has been shown that the various geometries used to compute the tearing energy produce the same crack growth rates for equivalent tearing energies—that is, the growth rate is independent of the geometry chosen for the evaluation and as such appears to be a material parameter. In the literature, this parameter is often also labeled G, but we choose T here to avoid confusion with the shear modulus, the latter labeled G elsewhere in this specification. A few of these basic geometries will be discussed here to provide a context for the evaluation of an acceptable design limit for the bellows geometry.

Figure 44:
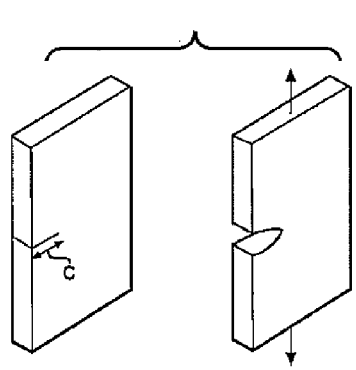
FIG. 44 is a drawing illustrating load and crack orientation for tensile specimen tearing energy configuration.

In the case of a uni-axial tensile specimen, as shown in FIG. 44, the tearing energy can be related to the strain energy stored in the part, and the length of the crack by the following equation:

$$T = 2kUc \tag{A.32}$$

where k is a strain dependent parameter, with a value near 3 for small strains, U is the strain energy density, and c is the crack length. In this case, the tearing energy is proportional to the crack length (see FIG. 44).

Figure 45:
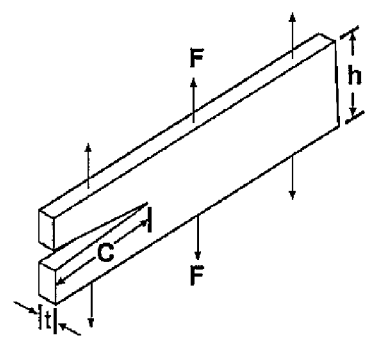
FIG. 45 is a drawing illustrating the shear geometry.

For the case of pure shear loading, as shown in FIG. 45, where the width of the part is large compared to the crack length and the crack length is large compared to the height and thickness of the part, it was shown by Rivlin and Thomas (R. S. Rivlin and A. G. Thomas. "Rupture of Rubber. I. Characteristic Energy for Tearing", Journal of Polymer Science, Volume 10, No. 3, pg 291-318. (1953) See in particular pgs starting at 304) that the tearing energy is independent of crack length. Geometries like this are particularly useful for characterizing the material crack growth rate. The argument offered can be stated rather simply; as a crack advances an amount dc, the volume of unstrained rubber (substantially behind the crack tip) grows by an amount $(h_o t)dc$ at the expense of rubber nominally elsewhere with having a uniform strain energy density U. This loss of strain energy can be directly related to the production of crack length via:

$$T = \left(\frac{dE}{dA}\right) = \frac{Uh_0 t dc}{t dc} = Uh_0. \tag{A.33}$$

Figure 46:
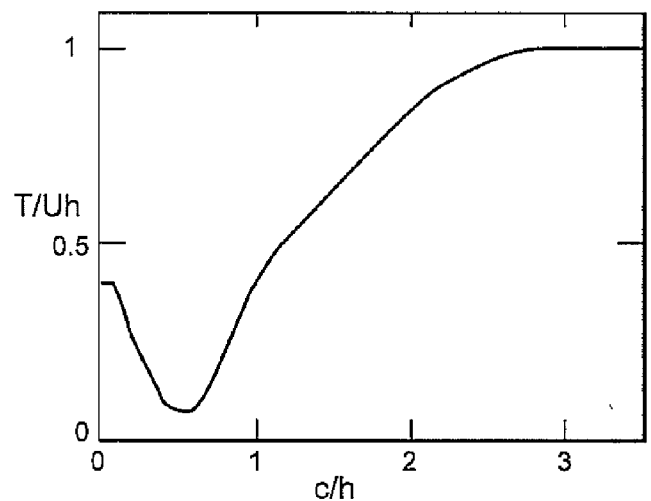
FIG. 46 is a graph illustrating the relationship between tearing energy, strain energy density and block height as a function of crack length ratio.

Beyond these simple cases, it appears to become more challenging rather quickly to establish a tearing energy for even simple, but practical loading configurations. For the case of a block in ordinary simple shear, it turns out that for large cracks relative to the width, the same relation given in the above equation holds. However in bonded blocks subjected to simple shear, with small cracks near the bond interface, finite element analysis on cases with a range of ratios of initial crack length to height of the shear block, produces an additional coefficient relating the quantities in above equation whose magnitude can be read off FIG. 46, at the corners where an acute angle occurs, with smaller values of T elsewhere, especially at the obtuse corners. FIG. 46 illustrates a relationship between tearing energy T, strain energy density and block height h, as a function of crack length ratio (c/h) for a bonded block in simple shear and a crack near the bond interface obtained by finite element analysis. Note that when c/h is small, T=0.4 Gh.

For the case of ordinary compression of cylindrical blocks, Stevenson (A. Stevenson, "A fracture mechanics study of the fatigue of rubber in compression", International Fracture, Vol 23, (1983) p 47-59) observed the typical shape of failure surfaces, and simply assumed it to be plausible that crack growth could be independent of the crack length in the case of bonded cylindrical blocks in compression; by calculating the fracture surface area, and the loss in stiffness of a block which had physically lost material (cracks typically followed a parabolic profile and cut out an annulus of material) he obtained a fairly involved result for the tearing energy. For blocks at strains less than 50% and which have ratios of cross-sectional area (load area) to free surface of 0.5 or greater (0.5 corresponding to a 'square' aspect ratio), he says the relation $$T = \frac{1}{2}Uh \tag{A.34}$$

can be used (with errors of less than 40%); in his analysis the strain energy density to be used (which is not at all uniform) is that computed from the equivalent structure compression modulus and the global compressive strain.

Current literature discusses the absence of a well established approach toward estimating the crack growth associated with a complex loading configuration. In an article (W. V. Mars and A. Fatemi, "Factors that Affect the Fatigue Life of Rubber: A Literature Survey", Rubber Chemistry and Technology, Vol 76 p 319-412 (August 2004)) discussing the factors which impact fatigue in rubbers, Mars and Fatemi write " . . . to date, the effects of multiaxial loading are not fully understood." They further state that "Although recent advances in simulation technology make it possible to predict realistic multiaxial loading histories, the ability to predict fatigue life from the computed loading histories has been lacking. The need for progress in this area is great."

Mars and Fatemi attribute to Stevenson and others success for bearings with small cracks subjected to a combination of pressure and shear in the form $$T = (\sqrt{T_c} + \sqrt{T_s})^2 \tag{A.35}$$

where the individual tearing energies associated with compression and shear are added in this (non-quadrature) way, leading to a result " . . . reported to be conservative".

Recent methods have also been proposed which attempt to account of the crack orientation to produce a modified "cracking energy density" which depends on the state of loading and the crack orientation. It appears, however, that short of a finite element method which can directly access the amount of strain energy liberated by particular imposed crack growth increment (and direction, since it may be a function of crack growth direction) for a multi-axial state of stress it is difficult to know what level of strain is acceptable for large lifetimes.

What is clear is that strain energy density is fundamentally an important quantity in the analysis; refinements to fatigue theory, as they become known in the art, will inform future designs, but the basic ingredients will not change. Here, for purposes of illustration, we use the highest local strain energy density anticipated in the part to attempt to estimate the tearing energy, despite the absence of completely clear theoretical support for the range of validity: in a sense, this is like treating all problems, at a microscale, as similar to the tensile case. In essence, the question comes down to "How small a crack, is a small crack?" Mars and Fatemi (W. V. Mars and A. Fatemi, "A literature survey on fatigue analysis approaches for rubber", International Journal of Fatigue, Vol 24 (2002) pg 949-961) indicate that this approach has been used by a number of researchers, and remains in use today, in spite of some of its drawbacks. As an example of the failings of such an approach, they mention that experimenters have produced configurations in which the strain energy was invariant, but parts subjected to such loads nonetheless experience fatigue failures, pointing to the inherent problems with use of a scalar quantity to estimate tearing energy. Nevertheless, one still sees this approached put forth—buried within an example problem, this approach is illustrated in *Engineering with Rubber: How to Design Rubber Components*, $2^{nd}$ Ed., A. Gent editor, HanserGardner Publications, Cincinnati Ohio, for the case when "crack lengths are small compared to the specimen size".

To take the latter approach, an assumption is required—that associated with the initial flaw size. Based upon the theory of stress concentrations and failure stress for various cut lengths, and using this data to extrapolate back to a no-cut conditions, internal flaws in otherwise perfect materials on the order of 40+/−20 microns are implied and this minimum flaw size appears to be statistically true for samples as small as a 2 mm cube. This value represents a reasonable goal for surface quality, and a lower bound toward estimating infinite life. A more conservative value for an initial flaw size of 150 microns (0.006 in) might be used as a practical value for calculations.

Referring to values used in a previous example calculation, we will assume a square aspect ratio in the elastomer, if we assume a combined pressure and axial strain we could estimate a peak local shear strain of 0.60; for purposes of calculation using the tearing energy criterion noted earlier:

$$T = kc\Delta U \quad (A.36)$$

This results in a tearing energy of 47.5 J/m² which, if valid for the computation of the tearing energy, should lie within the regime (in the absence of oxygen or ozone) of virtually zero crack growth. With the exception noted above regarding the relationship between hysteresis and endurance limit, which is an issue at large strains, we can say that for the both fatigue and dissipation, strain energy is the important parameter.

Figure 47:
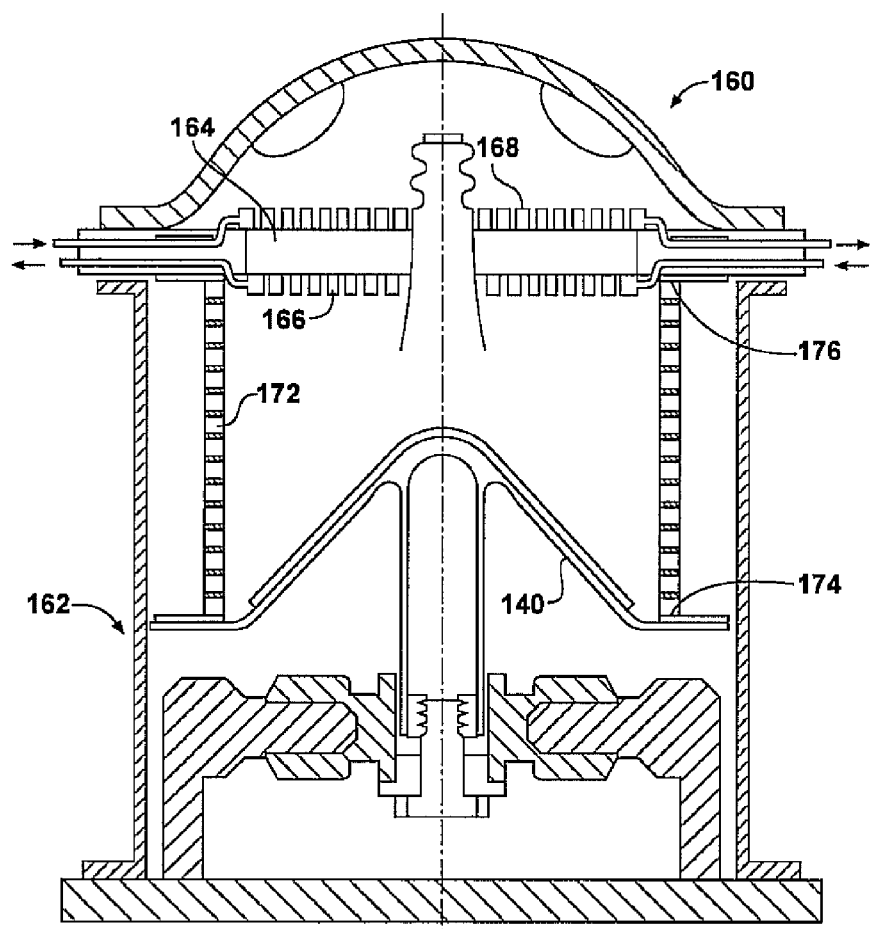
FIG. 47 is a cross-sectional view of an exemplary thermoacoustic device including a bellows or flexure seal according to the present invention.

Referring now to FIG. 47, a thermoacoustic device is shown generally at 160. The device has a housing 162 with a thermal core 164 disposed therein. The thermal core includes at least a first heat exchanger 166 and a second heat exchanger 168. A piston 170 is spaced from the thermal core. A bellows 172 according the present invention has a first end 174 sealed to the piston and a second end 176 in fluid communication with the thermal core. In this illustrated embodiment, the bellows is a hoop stack with generally uniform wall thickness. Preferably, the bellows in constructed in accordance with one of the embodiments discussed above. More details on the illustrated thermoacoustic device may be obtained from U.S. Pat. No. 6,755,027.

Figure 48:
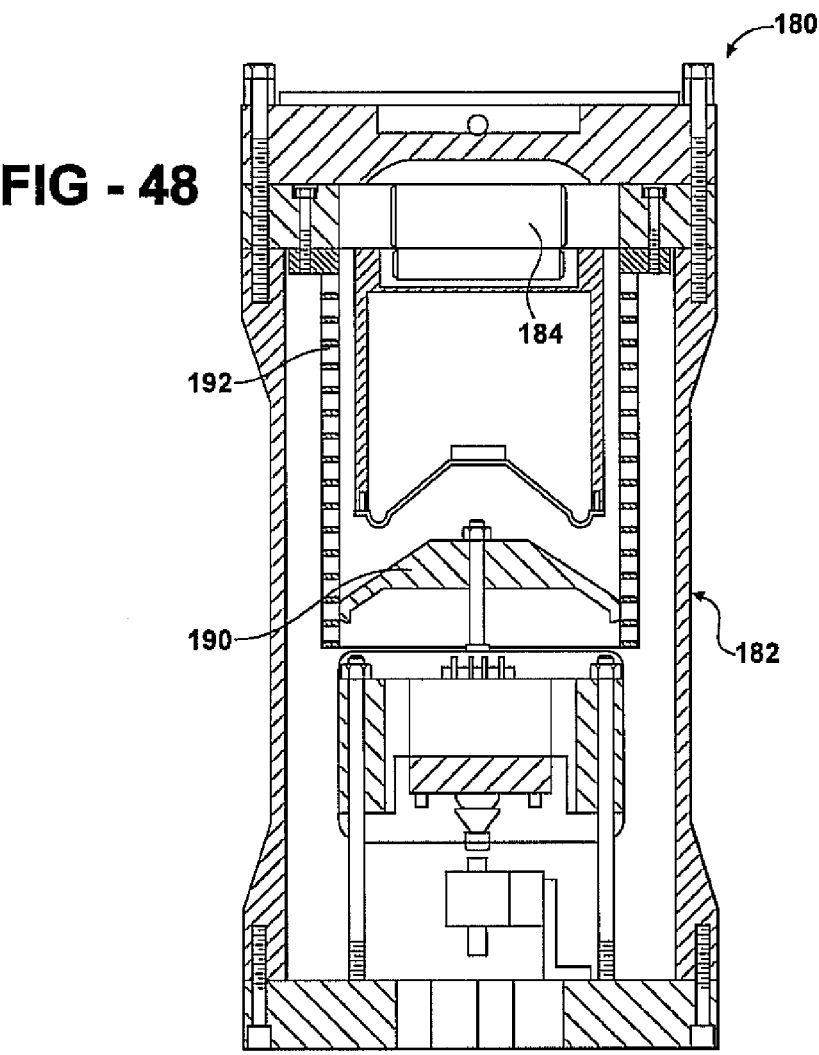
FIG. 48 is a cross-sectional view of another exemplary thermoacoustic device using a bellows or flexure seal according to the present invention.

FIG. 48 illustrates an alternative thermoacoustic device 180 with a housing 182 and a thermal core 184 disposed therein. The piston is shown at 190 and a bellows according to the present invention is shown at 192.

As will be clear to those of skill in the art, the inventive bellows described herein may be used in a variety of other applications wherein the bellows undergoes periodic compression and expansion along it axis. Such a bellows experiences a global axial strain or reduction/expansion in volume in a direction parallel to the bellows axis while simultaneously providing a seal against an oscillatory pressure variation with substantially the same period. For purposes of definition, applications suitable for use of the inventive bellows may be called a "dynamic device" having a base of some type, a moving element, and uses the inventive bellows for a seal between the base and the moving element. In the thermoacoustic devices described above, the moving element is the piston and the base is the structure to which the other end of the bellows is attached. For example, this structure may be the housing supporting the thermal core. Further, a "dynamic device" is one in which the moving element and the base move relative to each other or oscillate along the longitudinal axis of the bellows that extends between them.

Other "dynamic devices" according to the present invention include Stirling engines and refrigerators and mechanical pumping devices. A review of the patent literature indicates that use of bellows seals has been proposed in many ways in Stirling engines and refrigerators, as may be seen for example in U.S. Pat. Nos. 6,843,057 to Yammamoto, 6,546,738 to Sekiya et al., or 4,381,648 to Balas Jr. It should also be clear that dynamic devices are not limited to the Stirling cycle; U.S. Pat. No. 7,284,372 describes use of a dynamic bellows seal in a machine executing a Crow cycle. Various other cooling cycles which employ mechanical work imparted by a piston to deliver work to a gas, such as pulse-tube cryocoolers, can also benefit from a bellows of the sort described herein.

There are a number of other examples of dynamic devices. U.S. Pat. No. 6,176,897 described a high frequency pressure swing adsorption gas separation/purification device, and describes usage of a dynamic bellows as an alternative to a piston with sliding seal. Again, as similar considerations prevail—that is the desire for high fatigue life and/or low power dissipation, one can readily imagine bellows of the type described herein to be of use. Examples of reciprocating bellows pumps exist in the patent literature as well: U.S. Pat. No. 5,893,707 describes a pump employing bellows in a dynamic bellows application. All of these applications are incorporated herein as falling within the definition of "dynamic device." It will be appreciate by those skilled in the art, that the applications cited above do not represent an exhaustive list, and are offered to illustrate the scope.

Figure 49:
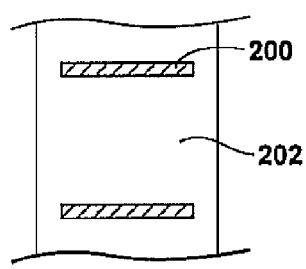
FIG. 49 is a cross-sectional view of a portion of a bellows according to the present invention wherein the low compliance layer has inner and outer edges covered with a high compliance material.
Figure 50:
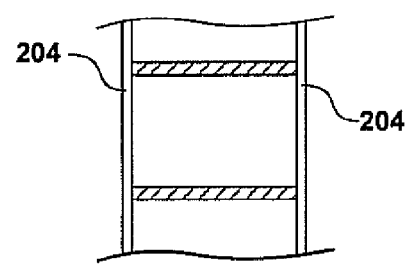
FIG. 50 is a cross-sectional view of a bellows according the present invention including an inner and outer covering layer.

As will be appreciated by those of skill in the art, the embodiments described herein may be altered in various ways without departing from the scope or teaching of the invention. For example, FIG. 49 provides a detailed cross section of a portion of a hoop-stack bellows in which the hoop shaped element 200 of low compliance material is embedded in the high compliance material 202 such that the high compliance material covers the inner and outer radius of the low compliance element 200. Alternatively, the high compliance material may cover only the inner or the outer radius. This embedding may provide some benefits, such as protecting the low compliance material. The embodiment may still be considered to consist of alternating layers of high and low compliance material since the low compliance elements are separated from each other by layers of high compliance material. The high compliance material covering the inner and/or outer radius of the low compliance element may just be considered a covering or coating. FIG. 50 illustrates a further alternative of hoop-stack bellows in which a covering or coating 204 is provided for both layers on the inner and/or outer surface. This may be a different material and just provides a protective covering for the alternating layers forming the bellows.

Further alternatives will be clear to those of skill in the art. It is the following claims, including all equivalents, which define the scope of the present invention.

I claim:

1. A bellows for use in a dynamic device, comprising:
   a generally tubular elongated bellows body having a first end and a second end with a midportion extending therebetween, the body having a cross sectional shape and a cross sectional dimension, a longitudinal bellows axis being defined from the first end to the second end;
   the bellows body defined by a wall generally enclosing a volume, the wall having a generally cylindrical inner surface and a generally cylindrical outer surface;
   the bellows body comprising a stack of generally hoop shaped elements alternating between generally hoop shaped elements formed of a high compliance material and generally hoop shaped elements formed of a low compliance material, the generally hoop shaped elements formed of the high compliance material having an inner radius defining a portion of the inner surface of the wall and an outer radius defining a portion of the outer surface of the wall, the inner radius spaced from the outer radius by a thickness, t, and the generally hoop shaped element having a height, h; and the cross sectional shape and dimension are generally constant between the first and second ends;

wherein the thickness, t, and the height, h, for each of the layers of high compliance material are chosen such that;

the total strain energy, $U_{strain\_total}$, in each of the high compliance layers, as given by the formula:

$$U_{strain\_total} = \frac{1}{2} G\varepsilon^2 \left(4(t \cdot h) + \frac{t^3}{h}\right) + \left(\frac{\Delta P^2}{2G}\right)\frac{h^3}{12t}.$$

is within 20% of a minimum obtainable total strain energy for any values of t and h;

or;

the maximum shear strain, $\gamma_{xy\_max}$, in each of the high compliance layers, as given by the formula:

$$\gamma_{xy\_max} = \left(\frac{\Delta P}{G}\right)\frac{h}{2t} + 3\frac{\varepsilon t}{h}$$

is within 20% of a minimum obtainable maximum shear strain for any values of t and h;

wherein G is a predetermined shear modulus of the high compliance material;

ε is a predetermined axial strain of the high compliance material along the longitudinal axis of the bellows; and ΔP is a predetermined peak dynamic pressure difference between a pressure in the volume enclosed by the bellows and a pressure exterior to the bellows.

2. The bellows of claim 1, wherein each of the generally hoop shaped elements formed of the low compliance material has an inner radius and an outer radius spaced apart by distance less than the thickness between the inner radius and the outer radius of the generally hoop shaped elements formed of the high compliance material.

3. The bellows of claim 1, wherein each of the generally hoop shaped elements formed of the low compliance material has an inner radius defining a portion of the inner surface of the wall and an outer radius defining a portion of the outer surface of the wall, the inner radius spaced from the outer radius by the thickness, t, the inner radius of the generally hoop shaped element formed of the high compliance material being the same as the inner radius of the generally hoop shaped element formed of the low compliance material.

4. The bellows of claim 1, wherein the high compliance material is strain crystallizing elastomer.

5. The bellows of claim 4, wherein the strain crystallizing elastomer is natural rubber.

6. The bellows of claim 1, further comprising a coating covering the inner and/or outer surface of the wall defining the bellows body.

7. A dynamic device comprising:
a base;
a moving element spaced from the base,
a bellows comprising:
a generally tubular elongated bellows body having a first end sealed to the moving element and a second end connected to the base, the bellows body having a longitudinal axis extending from the first end to the second end, the body having a cross sectional shape and a cross sectional dimension;

the bellows body defined by a wall generally enclosing a volume, the wall having an inner surface and an outer surface;

the bellows body comprising alternating layers of low compliance material and high compliance material, each of the layers of high compliance material of the bellows body being a generally hoop shaped element formed of the high compliance material, the hoop shaped element having an inner radius defining a portion of the inner surface of the wall and an outer radius defining a portion of the outer surface of the wall, the inner radius spaced from the outer radius by a thickness, t, and the generally hoop shaped element having a height, h:

the cross sectional shape and dimension of the bellows body being generally constant between the first and second ends;

wherein the moving element oscillates relative to the base along the longitudinal axis so as to expand and compress the volume enclosed by the bellows; and wherein the thickness, t, and the height, h, for each of the layers of high compliance material are chosen such that the total strain energy, $U_{strain\_total}$, in each of the high compliance layers, as given by the formula:

$$U_{strain\_total} = \frac{1}{2} G\varepsilon^2 \left(4(t \cdot h) + \frac{t^3}{h}\right) + \left(\frac{\Delta P^2}{2G}\right)\frac{h^3}{12t}.$$

is within 20% of a minimum obtainable total strain energy for any values of t and h;

wherein G is a predetermined shear modulus of the high compliance material;

ε is a predetermined axial strain of the high compliance material along the longitudinal axis of the bellows; and ΔP is a predetermined peak dynamic pressure difference between a pressure in the volume enclosed by the bellows and a pressure exterior to the bellows.

8. The dynamic device of claim 7, wherein the dynamic device is a thermoacoustic device; and wherein:
the base is a housing with a thermal core disposed in the housing, the thermal core including at least a first and a second heat exchanger; and
the moving element is a piston spaced from the thermal core, the piston being operable to oscillate with respect to the thermal core.

9. The dynamic device of claim 7, wherein each of the layers of low compliance material of the bellows body is a generally hoop shaped element formed of the low compliance material, each hoop shaped element of the low compliance material having an inner radius defining a portion of the inner surface of the wall and an outer radius defining a portion of the outer surface of the wall, the inner radius spaced from the outer radius by the thickness, t, the inner radius of the generally hoop shaped element formed of the high compliance material being the same as the inner radius of the generally hoop shaped element formed of the low compliance material.

10. The dynamic device of claim 7, wherein the each of the layers of low compliance material of the bellows body is a generally hoop shaped element formed of the low compliance material, each hoop shaped element formed of the low compliance material having an inner radius and an outer radius spaced apart by distance less than the thickness between the inner radius and the outer radius of the generally hoop shaped elements formed of the high compliance material.

11. The dynamic device of claim 7, wherein the high compliance material is strain crystallizing elastomer.

12. The dynamic device of claim 7, further comprising a coating covering the inner and/or outer surface of the wall defining the bellows body.

13. A dynamic device comprising:
a base;
a moving element spaced from the base,
a bellows comprising:
a generally tubular elongated bellows body having a first end sealed to the moving element and a second end connected to the base, the bellows body having a longitudinal axis extending from the first end to the second end, the body having a cross sectional shape and a cross sectional dimension;
the bellows body defined by a wall generally enclosing a volume, the wall having an inner surface and an outer surface;
the bellows body comprising alternating layers of low compliance material and high compliance material, each of the layers of high compliance material of the bellows body being a generally hoop shaped element formed of the high compliance material, the hoop shaped element having an inner radius defining a portion of the inner surface of the wall and an outer radius defining a portion of the outer surface of the wall, the inner radius spaced from the outer radius by a thickness, t, and the generally hoop shaped element having a height, h;
the cross sectional shape and dimension of the bellows body being generally constant between the first and second ends;
wherein the moving element oscillates relative to the base along the longitudinal axis so as to expand and compress the volume enclosed by the bellows; and
wherein the thickness, t, and the height, h, for each of the layers of high compliance material are chosen such that the maximum shear strain, $\gamma_{xy\_max}$, in each of the high compliance layers, as given by the formula:

$$\gamma_{xy\_max} = \left(\frac{\Delta P}{G}\right)\frac{h}{2t} + 3\frac{\varepsilon t}{h}$$

is within 20% of a minimum obtainable maximum shear strain for any values of t and h;

wherein G is a predetermined shear modulus of the high compliance material;
$\varepsilon$ is a predetermined axial strain of the high compliance material along the longitudinal axis of the bellows; and
$\Delta P$ is a predetermined peak dynamic pressure difference between a pressure in the volume enclosed by the bellows and a pressure exterior to the bellows.

14. The dynamic device of claim 13, wherein the dynamic device is a thermoacoustic device; and wherein:
the base is a housing with a thermal core disposed in the housing, the thermal core including at least a first and a second heat exchanger; and
the moving element is a piston spaced from the thermal core, the piston being operable to oscillate with respect to the thermal core.

15. The dynamic device of claim 13, wherein each of the layers of low compliance material of the bellows body is a generally hoop shaped element formed of the low compliance material, each hoop shaped element formed of the low compliance material having an inner radius defining a portion of the inner surface of the wall and an outer radius defining a portion of the outer surface of the wall, the inner radius spaced from the outer radius by the thickness, t, the inner radius of the generally hoop shaped element formed of the high compliance material being the same as the inner radius of the generally hoop shaped element formed of the low compliance material.

16. The dynamic device of claim 13, wherein the each of the layers of low compliance material of the bellows body is a generally hoop shaped element formed of the low compliance material, each hoop shaped element formed of the low compliance material having an inner radius and an outer radius spaced apart by distance less than the thickness between the inner radius and the outer radius of the generally hoop shaped elements formed of the high compliance material.

17. The dynamic device of claim 13, wherein the high compliance material is strain crystallizing elastomer.

18. The dynamic device of claim 13, further comprising a coating covering the inner and/or outer surface of the wall defining the bellows body.

* * * * *

UNITED STATES PATENT AND TRADEMARK OFFICE
CERTIFICATE OF CORRECTION

PATENT NO. : 8,025,297 B2  
APPLICATION NO. : 11/935787  
DATED : September 27, 2011  
INVENTOR(S) : Robert W. M. Smith Page 1 of 1

It is certified that error appears in the above-identified patent and that said Letters Patent is hereby corrected as shown below:

In the Specification:

At column 5, line number 34, After according Insert -- to --  
At column 8, line number 45, Delete " $\overline{Sin^3}$ " Insert -- $\overline{sin^2}$ --  
At column 10, line number 56, Delete "know" Insert -- known --  
Table 1: Delete "104" Insert -- $10^4$ --  
Table 4: Delete "Begining" Insert -- Beginning --  
At column 23, line number 26, Delete "case" Insert -- line --  
At column 24, line number 37, Delete second occurrence of "of a range"  
At column 25, line number 39, Delete "high" Insert -- low --  
At column 25, line number 47, Delete "the"  
At column 25, line number 55, Delete "there for" Insert -- therefor --  
At column 26, line number 25, Delete "as it" Insert -- as if --  
At column 28, line number 66, Delete "others" Insert -- other --  
At column 29, line number 45, Delete "by"  
At column 35, line number 26, After lifetime Insert -- . --  
At column 36, line number 40, After shorter Insert -- than --  
At column 40, line number 65, Delete "approached" Insert -- approach --  
At column 41, line number 39, After bellows Delete "in" Insert -- is --  
At column 41, line number 50, Delete "it" Insert -- its --

In the Claims:  
At column 42, line number 24, Delete "appreciate" Insert -- appreciated --

Signed and Sealed this  
Eighth Day of October, 2013

Teresa Stanek Rea  
*Deputy Director of the United States Patent and Trademark Office*